United States Patent [19]

Noble et al.

[11] Patent Number: 5,822,585

[45] Date of Patent: Oct. 13, 1998

[54] SYSTEM AND METHOD FOR COOPERATIVE PROCESSING USING OBJECT-ORIENTED FRAMEWORK

[75] Inventors: William Noble, South Lyon; Michael Knight, Northville; Karen Nelson-Katt, West Bloomfield, all of Mich.

[73] Assignee: Compuware Corporation, Farmington Hills, Mich.

[21] Appl. No.: 866,471

[22] Filed: May 30, 1997

Related U.S. Application Data

[63] Continuation of Ser. No. 391,101, Feb. 21, 1995, abandoned.
[51] Int. Cl.$^6$ ..................................................... G06F 15/16
[52] U.S. Cl. ...................... 395/680; 395/684; 395/200.03
[58] Field of Search .................................. 395/680, 684, 395/200.03

[56] References Cited

U.S. PATENT DOCUMENTS

| 5,249,290 | 9/1993 | Heizer | 395/650 |
| 5,321,841 | 6/1994 | East et al. | 395/725 |
| 5,367,680 | 11/1994 | Flurry et al. | 395/650 |

OTHER PUBLICATIONS

"Distributed Operating Systems, the Logical Design" Andrzej Gascinski by Addison–Wesley Publishing Co. 1993.

Dannenberg, R. B., "A Butler Process for Resource Sharing on Spice Machines", *ACM Transactions on Office Information Systems*, vol. 3, No. 3, pp. 234–252, Jul. 1985.

*Primary Examiner*—Lucien U. Toplu
*Assistant Examiner*—Alice Park
*Attorney, Agent, or Firm*—Fenwick & West LLP

[57] ABSTRACT

An object-oriented framework is used to build cooperative objects. Objects can span processes on different machines connected by a network. The objects are used to build distributed or cooperative applications which execute in multiple environments without having to write significant additional code to enable such functionality. Each cooperative object has two parts: an agent object and a server object. Requests for services are made to agent objects by the application program (via an asynchronous interface) as if they were local objects. The server object performs the requested service in the server process, possibly using other server objects or systems (e.g., DB/2), and returns the result to the associated agent object. A Distributor and Dispatcher object in each process handle communication between agent and server objects. The Distributor receives all incoming messages and routes them to the appropriate objects in the process. The Dispatcher is used for sending messages to other objects. Agent and server objects use framework methods SendMessage and HandleMessage to send/receive messages to/from other objects. Message data is converted to account for parameter types in different processing environments (e.g., byte-swapping and ASCII to EBCDIC). Upon receipt of a message, the Distributor automatically calls the HandleMessage method of the receiving object. The object then processes the request according to the user-defined implementation of the HandleMessage method and, in the client process, notifies the application of the completion of a request via a Callback method.

14 Claims, 10 Drawing Sheets

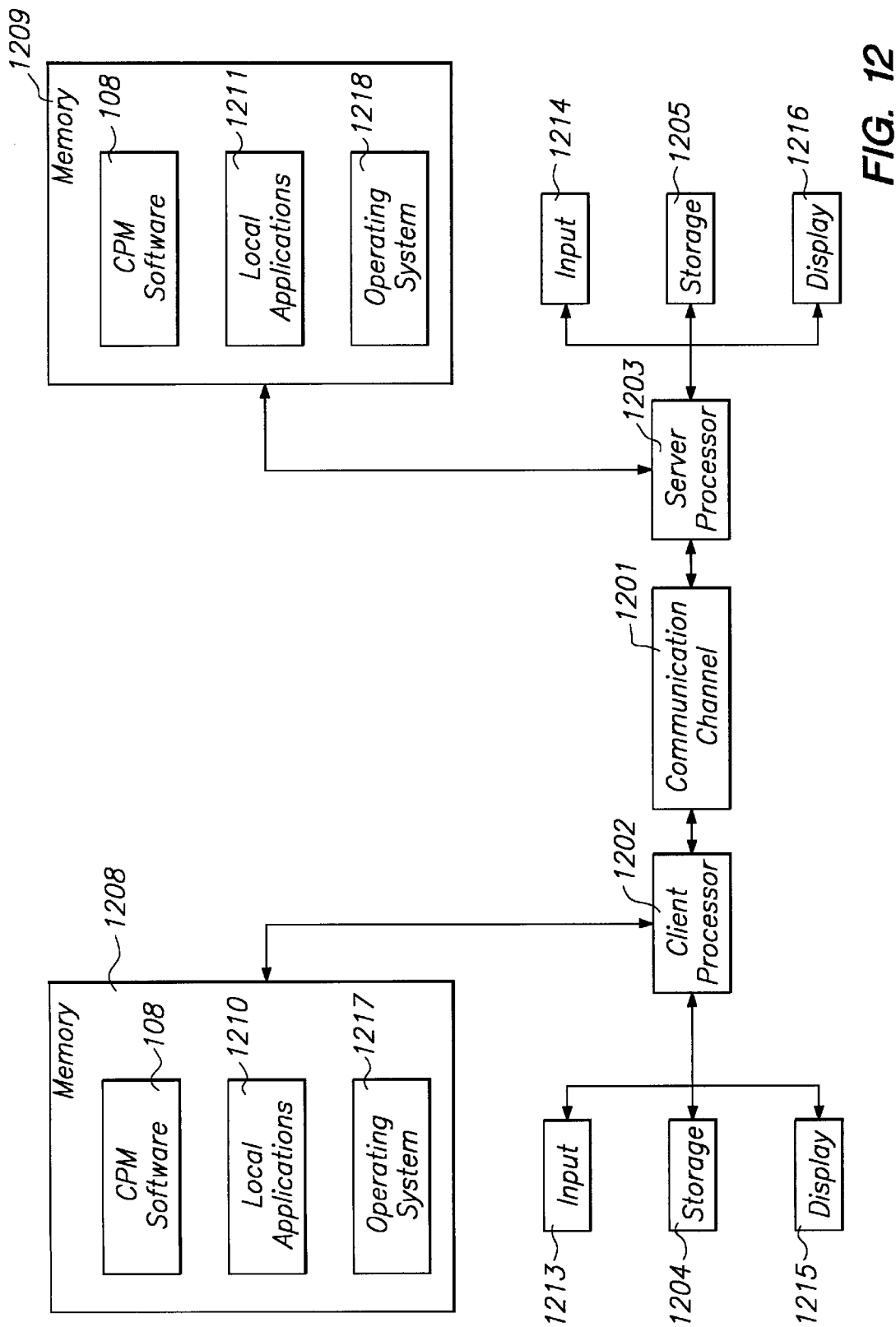

SYSTEM AND METHOD FOR COOPERATIVE PROCESSING USING OBJECT-ORIENTED FRAMEWORK

RELATED APPLICATIONS

This is a continuation of application Ser. No. 08/391,101 filed on Feb. 21, 1995 now abandoned.

BACKGROUND OF THE INVENTION

1. Field of the Invention

This invention relates generally to the field of cooperative processing, and more specifically to an object-oriented framework that can be used to create cooperative processing objects for use in cooperative or distributed processing application programs.

2. Background of the Invention

Software products are moving from the traditional single-computer/single-operating system environment to distributed environments with multiple systems, processors, and operating systems. Distributed processing generally refers to a system that uses several processing units in different locations. Cooperative processing generally refers to a system that employs multiple processes—on the same machine or distributed—to achieve a common goal.

In addition, software development methodologies are shifting from procedural languages to object-oriented languages like C++. Using such object-oriented programming languages, software objects can be distributed according to varying distribution models: distributed interface, distributed data, and distributed functionality. However, such distributed functionality is often difficult to achieve using conventional object-oriented programming languages. And, such distributed functionality generally requires networking and other low-level software programming expertise. Conventional high-level object-oriented programming languages do not support the seamless development of software objects at the application level whose data and/or implementation span multiple processes.

IBM and other companies have developed systems based on the Object Management Group's (OMG) Common Object Request Broker architecture (CORBA) for creating distributed objects (e.g., System Object Model by IBM). OMG-based technologies focus on separating the interface of an object from the implementation of the object. This allows an application developer to use the services of a remote object by invoking its local interface. This approach only addresses the distributed interface model of distribution. To implement a fully cooperative distributive product, the application developer must write application code to coordinate the actions of the local and remote objects. In addition, CORBA based technology uses a Remote Procedure Call (RPC) interface as the primary way to invoke object services. This forces the calling application to wait for a response to a request, or to use platform specific services (e.g., threads) to enable the application to accept other user input. In contrast, the primary interface to objects created with this invention is asynchronous, utilizing a call-back mechanism to notify the application when requests are complete. This model of interaction more closely matches todays event-driven, graphical user interfaces.

It would be desirable to have an application framework in which cooperative objects with distributed interface, data, and/or functionality can be efficiently created for use in cooperative or distributed processing application programs.

SUMMARY OF THE INVENTION

An object-oriented framework is used to build cooperative objects. Objects can span processes on a single machine, or processes on different machines connected by a network. The objects are then used to build distributed or cooperative products which execute in multiple environments simultaneously without having to write significant additional code to enable such functionality.

Each cooperative object has two parts: the interface with local implementation (called the agent object), and a remote implementation in a server process (called the server object). Requests for services are made to agent objects by the application program as if they were local objects. The requested services can be implemented fully by the agent, partially by the agent and partially by the remote implementation, or fully by the remote implementation. Requests to agent objects are made through an asynchronous interface; that is, results are returned to a different point of execution from where the request was made. This allows the user interface to process responses as events—in the same way that it already processes window events (e.g., mouse click, menu select).

The server object is responsible for handling service requests from an associated agent object and sending results back to the agent object. An agent object initiates the creation of an associated server object in the server process when the agent object in the client process is created. The server returns a unique handle to this new server object for the agent object to use in all subsequent requests. This step is referred to as the "bind processes." The server object can handle the requests from other objects itself, use the services of other objects (e.g., another server object), or invoke other systems, such as DB/2 or other applications on the server machine.

All client agents and server objects inherit from the same base class, AssocEntity. An additional base class, ExecutiveEntity, also inherits from AssocEntity. There is one object in each process which inherits from ExecutiveEntity which is responsible for establishing communications to the other process and, in the server process, for handling the bind requests discussed above.

The communication system between agent and server objects is established and maintained by two objects in each process—the Distributor and the Dispatcher. The Distributor receives all incoming messages and routes them to the appropriate objects within the process. In a client process, these messages are usually responses from server objects which are then routed to appropriate agent objects. In a server process, these messages are usually requests from agent objects which are then sent to appropriate server objects. The Dispatcher is used for sending messages to other objects. Across processes, the Dispatcher of the sending process sends messages to the Distributor of the receiving process.

The object-oriented framework also provides agent and server objects various communication methods. Agent and server objects use the SendMessage method to send messages to other objects. The SendMessage method takes as input a destination location (e.g., machine/process and object) and a Message object. The Message object contains an operation code, specifying the type of request, and the appropriate data in typed parameters. The Dispatcher converts the outgoing Message objects into encoded buffers and the Distributor converts the incoming buffers back into Message objects. Agent and server objects use the HandleMessage method to process incoming messages from other objects. Upon receipt of a message, the Distributor automatically calls the HandleMessage method of the receiving object when a message is received.

Because the framework is object-oriented, the design and implementation of the system can be reused and the cooperative objects created will have similar designs. Thus, design, testing, and, maintenance for cooperative objects, and the applications built with them, is significantly streamlined.

BRIEF DESCRIPTION OF THE DRAWINGS

FIG. 12 is a block diagram of the hardware and software components in the present invention.

DESCRIPTION OF THE PREFERRED EMBODIMENTS

Frameworks Introduction

Figure 1:
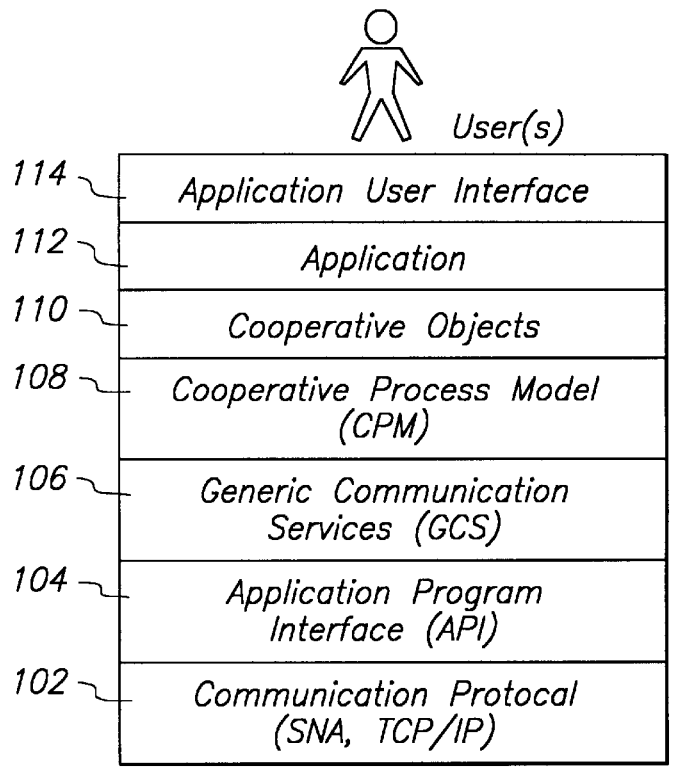
FIG. 1 illustrates a cooperative processing model (CPM) architecture.

An object-oriented framework is a tightly integrated set of objects that work together to simplify the development of multiple applications with similar requirements. Conventional frameworks are used for creating Windows, Presentation Manager (PM), and other Graphical User Interface (GUI) applications. Objects that are required for use in multiple applications or multiple products are generally good candidates for the development of a framework. The present invention describes a framework for creating cooperative processing objects that can be used in applications and products that require such cooperative or distributed functionality.

In general, frameworks have the following characteristics:

1. Frameworks encapsulate complex functionality and, when possible, execute this functionality without explicit calls.
2. Objects in a framework are generally accessed through inheritance, not instantiation.
3. Frameworks impose a general design on the application developer.

Encapsulation refers to the ability to hide the implementation of individual objects and the automation of certain functions which are needed for users of the framework. Although not frameworks, high-level programming languages, such as C or C++, demonstrate encapsulation— for example, static object initialization and the opening of standard I/O streams are performed by the compiler and run time libraries by simply defining a function called "main". The user does not need to call a function called InitStatics( ) or InitIO( ), or even a single function called Init( ). In fact, most users (e.g., programmers) do not need to know when or how initialization takes place—the user's only concern it that when a static object is used, or a message is printed on the terminal, it works. By encapsulating complex functionality, product development using a framework is faster since the application programmer can focus on the application or product requirements and not system requirements.

In the same way that object-oriented methodologies ease the development of reusable objects, frameworks ease the development of applications with common requirements. An application is developed using a framework by extending the framework through inheritance. This is a key difference between a framework and an object-oriented class library. In general, methods of a framework are not invoked, instead the framework is extended to add application-specific functionality. Extensibility allows the user of a framework to change the way an object behaves while still reusing the design of the framework and the rest of the objects. For example, a GUI class library may provide a Button object that displays a text label and generates an event when clicked with the mouse. This object is reusable by anyone needing a Button with a text label. However, if the Button object could be extended to allow an Icon (or any other object) to be displayed instead of a text label—while the original object still handled generating the mouse click event—the Button object would be much more reusable. An extensible framework allows the Button class to be used in ways that the original designer of the object class never imagined.

Object-oriented frameworks also impose an application design on developers using the framework. Generally it is not possible to use only part of the framework, or use a framework for a different purpose than it was intended, without losing most of its benefits. Because the framework is used through extension and inheritance, application code automatically follows the rules. For example, while C++ does encapsulate and execute complex functionality, it does not enforce any design consistency. Two developers creating objects to solve the same problem can (and often will) create two radically different designs. However, using a framework, even applications with different product requirements will have similar designs. Consequently, design, testing, and maintenance of different products built using a common framework is made much easier, even if the products have different functionality.

Cooperative Process Model (CPM)

The present invention defines an object-oriented framework for creating cooperative, distributed software applications. One embodiment of such invention is referred to as the Cooperative Process Model (CPM). CPM is a component in a cooperative process architecture as shown in FIG. 1. The cooperative process architecture 100 uses one or more communication protocols 102 such as NETBIOS, LU6.2, or TCP/IP. Application program interface (API) 104 interfaces to one or more communication protocols 102 to provide communication services. The Generalized Generic Communication Services (GCS) 106 layer is used to encapsulate and abstract API layer 104 to hide specific network protocols and increase portability of higher levels in the architecture.

CPM 108 is a framework used to create cooperative objects 110. Objects 110 are extensions of CPM 108 and are used by application programmers to create cooperative or distributed applications 112 or products. CPM 108 and objects 110 are discussed in detail below. CPM 108 is built using the communication objects and services of GCS 106, and is thus portable to any environment in which GCS 106 is implemented.

Application 112 is built using objects 110 to provide cooperative distributed processing capability. Application user interface (UI) 114 provides an interface to application 112.

CPM Functional Components

Figure 2:
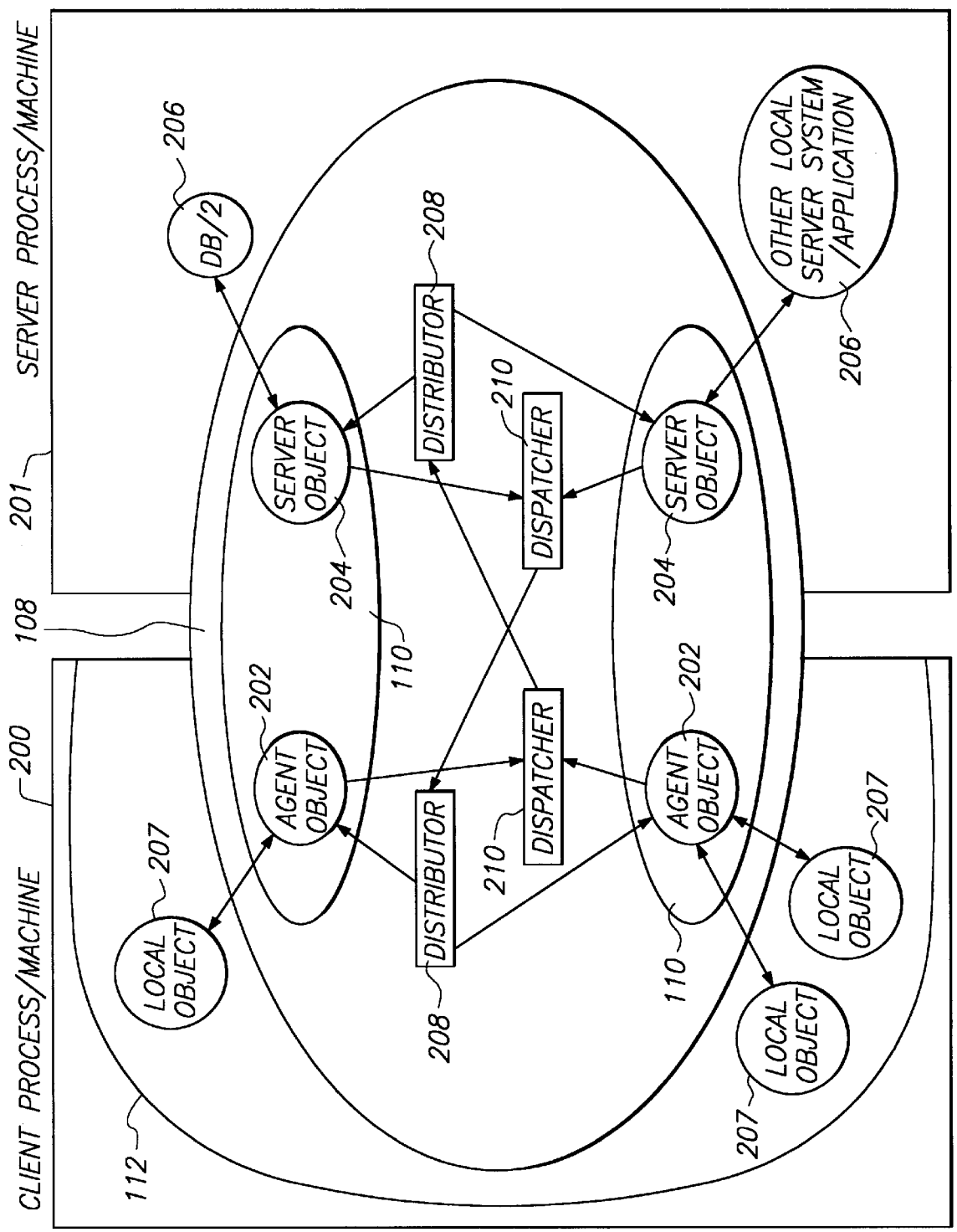
FIG. 2 is a high-level illustration of the functional components of CPM in a distributed process application.

FIG. 2 shows the high-level functional components of CPM 108 in a distributed process application 112. CPM provides cooperative distributed objects 110 to application 112. Objects 110 can span between processes on a single machine, or processes on different machines connected by a computer network. Objects 110 are then used to build cooperative products 112 which execute in multiple environments simultaneously without having to write additional code to enable such functionality.

Each cooperative object 110 has two component objects: an agent object 202 in a client process 200 and an associated server object 204 in a server process 201. Client and server processes 200, 201 run on conventional computers, for example, commercially available computers made by IBM, DEC, Apple, Amdahl, Compaq, and the like. Such computers have conventional processors commercially available, for example, Intel 80286, 80386, 80486, Pentium, Motorola 68020, 68030 and the like. Cooperative objects 110, components thereof (agent 202 and sever 204 objects), application program 112, and other CPM 108 components, are conventionally created and stored on such computers in electronic, magnetic, or other suitable computer memory.

Agent objects 202 are used by the client process 200 to request services. Application 112 invokes service requests and other operations directly from agent objects 202 as if they were local and/or through local client application objects 207. The requested services may be implemented fully by the agent object 202, partially by the agent object 202 and partially by the remote implementation (server object 204 possibly in conjunction with other objects or operations), or fully by the remote implementation.

Server object 204 is responsible for handling service requests from an associated agent object 202 and sending results back to the agent object. Server object 204 can handle the request itself, use services of another object (e.g., another server object 204), or invoke another system such as DB/2 or other applications 206 on the server machine 201.

The communication system between processes 200, 201 that contain agent 202 and server 204 objects is established and maintained by two objects in each process—the Distributor 208 and the Dispatcher 210. Distributor 208 receives all incoming messages and routes them to the appropriate objects 202, 204. In client process 200, the messages are usually responses from server objects 204 and are routed to the agent objects 202. In server process 201, the messages are usually requests sent to server objects 204 from agent objects 202. Dispatcher 210 is used by objects 202, 204 to send outgoing messages for processing. For example, requests and responses sent between cooperating agent-server objects 202, 204. Distributor 208 and Dispatcher 210 are discussed in detail below.

CPM Framework Logical Components

Figure 3:
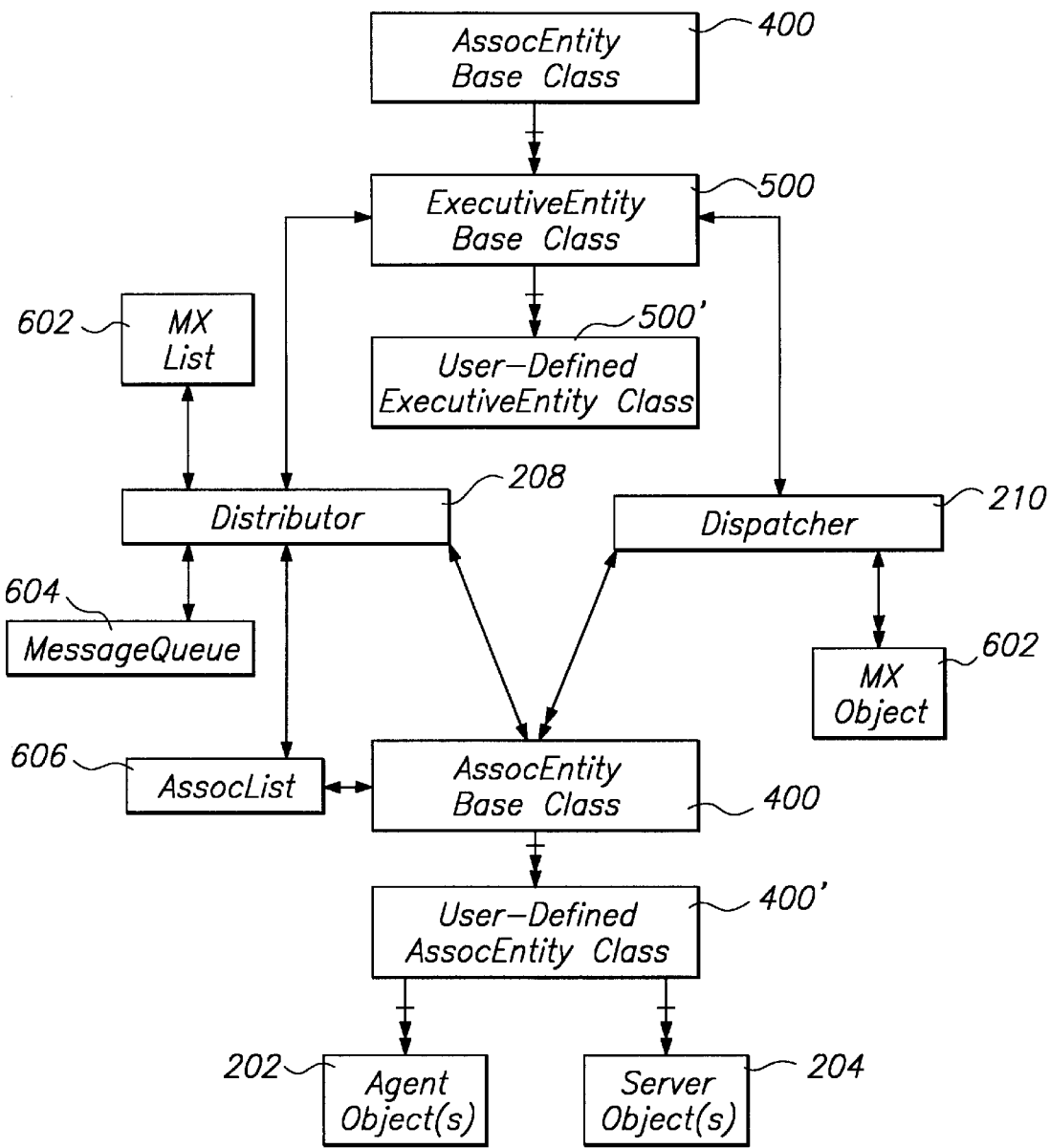
FIG. 3 is a high-level entity relationship diagram of the logical components of CPM.

FIG. 3 is a high-level entity relationship diagram of the logical components of CPM 108. In general terms, CPM framework 108 comprises four logical components: AssocEntity, ExecutiveEntity, Distributor, and Dispatcher. Distributor 208 and Dispatcher 210, as mentioned above, are also functional components of CPM 108. Each component and other sub-components are discussed in detail below.

AssocEntity

Figure 4:
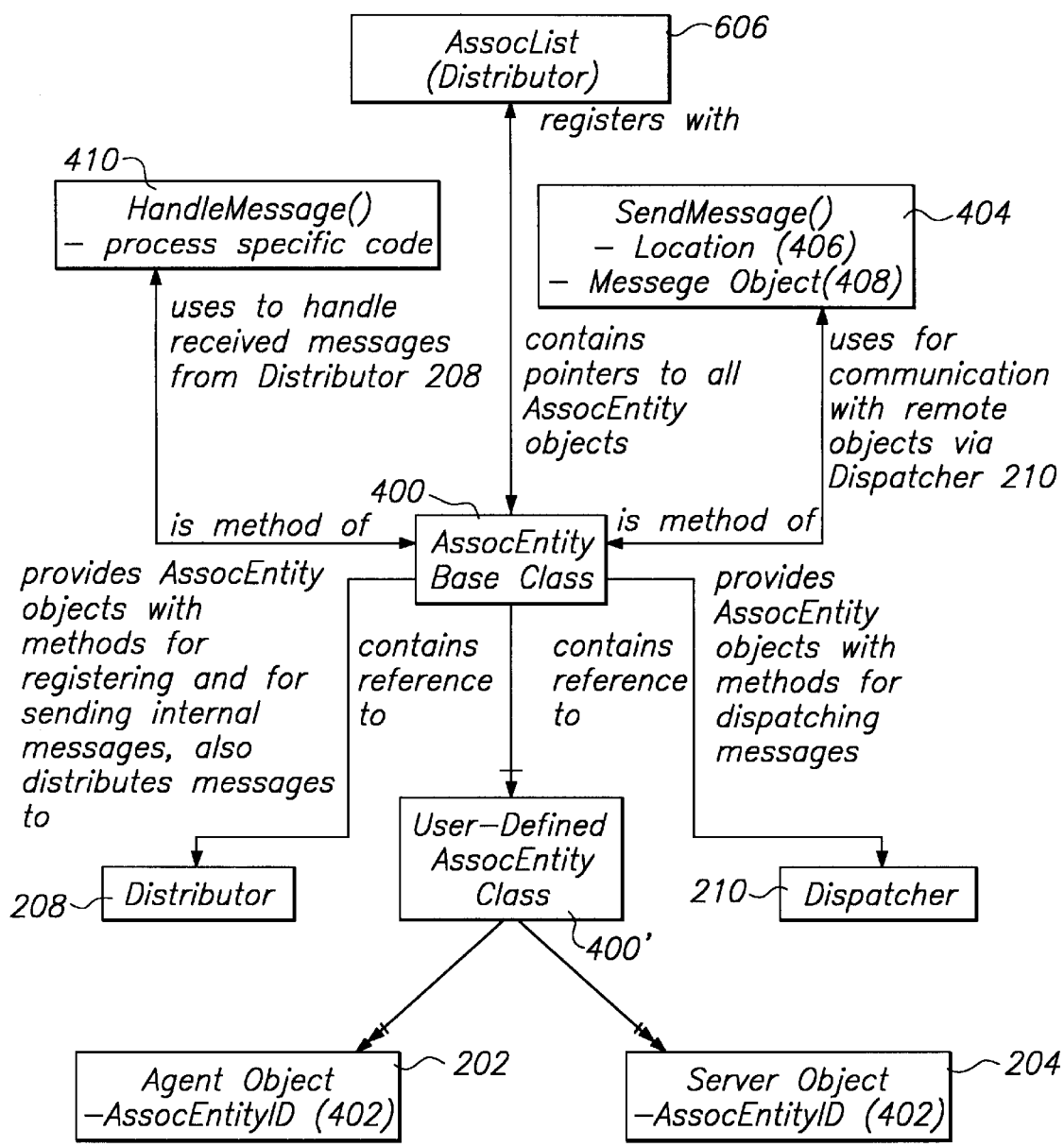
FIG. 4 is an entity relationship diagram of AssocEntity base class.

FIG. 4 is an entity relationship diagram of AssocEntity 400. Within an entity relationship diagram, boxes represent logical components, and arrow labels with text descriptions indicate the relationships between logical components. Text closest to the box is read just before reading the box. Relationships may be two-way. For example, in FIG. 5, "AssocEntity is the base class of ExecutiveEntity"; and, "ExecutiveEntity is derived from AssocEntity." As shown in the legend, relationships may be one-to-one, one-to-many, or an inheritance-type relationship. Inheritance is also indicated.

AssocEntity 400 is a virtual or abstract base class used to create agent objects 202 and server objects 204. A virtual base class is a class which contains one or more methods without implementations. An instance of a virtual base class cannot be created; instead, the class must be inherited from, and the missing method implementations supplied. Derived classes 400' are created (e.g., inherited and extended) that are specific to the needs of a particular distributed processing application 112.

AssocEntity base class 400 provides methods and means for objects instantiated from AssocEntity 400 (202, 204) to communicate. For example, methods such as HandleMessage( ) 410 to handle messages received by AssocEntity objects and SendMessage( ) 404 to send messages to other objects in the system. See appendix B for other example methods provided by base class AssocEntity that enable communication, management, and functionality (e.g., constructor, deconstructor, getLocation, setLocation, Handle, SendInternalMsg).

Derived class 400' is used to create instances of AssocEntity objects. Objects are generally created in pairs—agent 202 and server 204 objects—that form a cooperative object 110. When new AssocEntity objects 202, 204 are created, they automatically register themselves with AssocList 606 (maintained by Distributor 208). Each AssocEntity object 202, 204 is then given a unique AssocEntity ID 402 or handle which is used in communication with other objects in CPM 108.

A user of CPM 108 implements HandleMessage( ) method 410 (inherited from base class AssocEntity 400) in derived class 400' by defining the messages the object will respond to, and providing the problem solving code the messages will invoke. HandleMessage( ) 410 is automatically called by Distributor 208 when a message for an AssocEntity object 202, 204 is received. Code in HandleMessage( ) 410 should, for example, decide which process-specific method is to be called. For example, in server object 204, HandleMessage( ) 410 may invoke methods of the server object to satisfy requests of client object 202 and send data back to client object 202. For example, if server object 204 receives a query for DB/2 database information, HandleMessage invokes the proper methods in server object 204 to access and query the DB/2 database, and return the data to client object 202. In client object 202, HandleMessage( ) 410 may invoke methods in the client object to notify the caller that the request has been fulfilled.

AssocEntity base class 400 also provides SendMessage 404 method for object communication. SendMessage 404 has parameters location 406 and a Message object 408. A suitable location 406 is specified by, for example, the machine 200, 201 and object 202, 204 (e.g., AssocEntity object ID 402) to which the message is going.

Message objects 408 are part of GCS layer 106 and are used to provide a strongly typed machine-independent mechanism for representing data (requests and responses) between processes 200, 201. Message object 408 contains an operation code (opcode or operation id) specifying the type of request or response and appropriate data in typed parameters. Typed parameters are, for example, long, unsigned long, short, unsigned short, text string, byte string, and character. Parameters of the numeric types are automatically converted to the proper machine architecture (e.g., values are byte-swapped when sent between Intel and other machines). Parameters of type string are automatically converted between ASCII and EBCDIC character sets if needed. Data in Byte String and Character parameters are passed unchanged. Message object 408 provides methods for encoding/decoding and adding parameters of the standard data types of the language (e.g., C). Message object 408 is conventionally extended to support aggregates (structures and arrays) of the objects and collections of objects in addition to standard data types. Using the present invention, the precise implementation of the communication and other routing functionality is shielded from the application programmer.

As an example, to create a cooperative File object 110 in an application 112, a derived File class 400', which inherits from AssocEntity abstract base class 400, is created. File class 400' is extended to include methods such as Open, Close, Save, Read, and Write, and a method to maintain an in-memory cache of 50 records to optimize read performance. File class 400' is used to create agent 202 and server 204 objects in both client and server processes 200, 201 (server object 204 is automatically created by ExecutiveEntity 500 in the server process 201, as described below). Additional code in the agent object 202 may provide that if the agent needs more records or when records are changed, instead of accessing the file in the application 112, agent object 202 sends a message to its associate server object 204 in the server 201.

ExecutiveEntity

Figure 5:
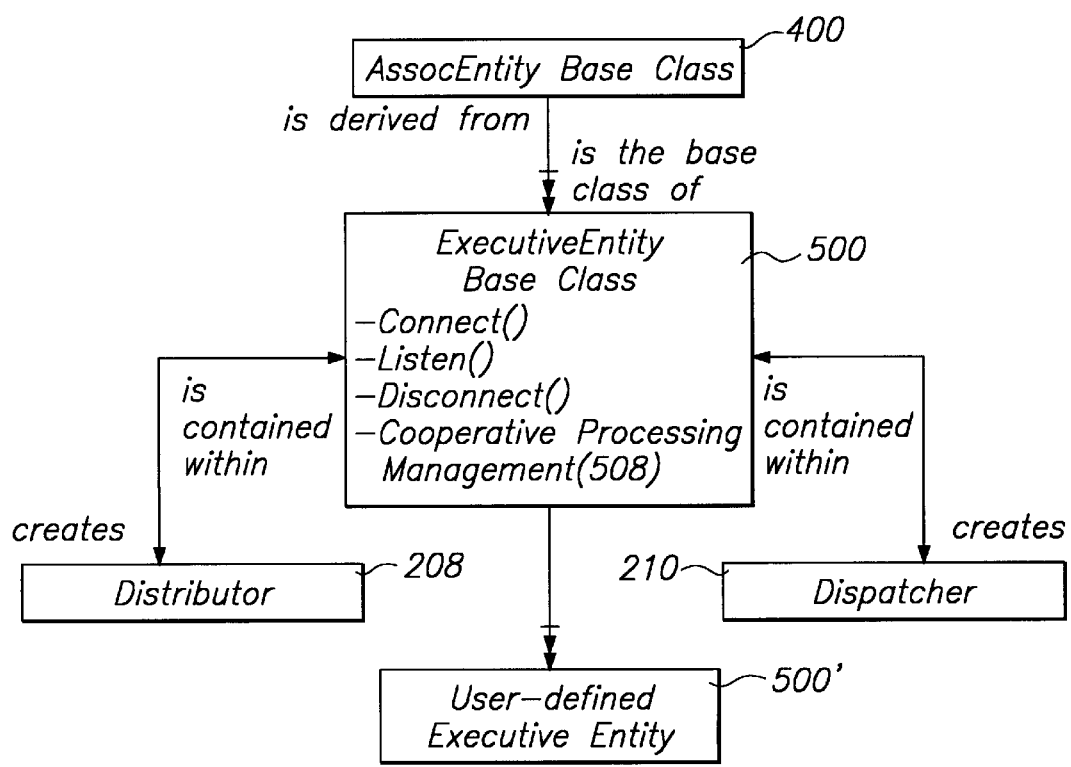
FIG. 5 is an entity relationship diagram of ExecutiveEntity base class.

FIG. 5 is an entity relationship diagram of ExecutiveEntity base class 500. ExecutiveEntity base class 500 is derived from AssocEntity base class 400 and provides means for process wide functionality and communication including the creation of Distributor 208 and Dispatcher 210 objects. As a derived AssocEntity object, ExecutiveEntity 500 is able to register with Distributor 208 and receive messages in the same manner as all other objects created from AssocEntity 400.

ExecutiveEntity 500 is also an abstract base class. Therefore, a derived or inherited class 500' for a particular application 112 must be created. The developer defines the messages that the derived ExecutiveEntity 500' will respond to, implements the HandleMessage( ) method, and provides problem solving code that the messages will invoke (see above).

There is generally one ExecutiveEntity object 500' per running process 200, 201. In the server process 201, ExecutiveEntity 500' handles requests to create new instances of AssocEntity objects (e.g., server objects). When a new agent object 202 is created on client machine 200, ExecutiveEntity 500' ensures that an associated server object 204 is created on server machine 201.

Executive Entity base class 500 provides CPM framework 108 with a communication structure by creating Distributor 208 and Dispatcher 210. Using GCS services 106, Distributor 208 and Dispatcher 210 allow ExecutiveEntity 500' and AssocEntity objects 202, 204 to send and receive messages and participate in dialogues. Distributor 208 and Dispatcher 210 are discussed in greater detail below.

ExecutiveEntity base class 500 provides CPM framework 108 methods for managing connections to other processes 200, 201. For example, methods such as Connect( ) 502, Listen( ) 504, and Disconnect( ) 506 allow application 112 to create and maintain multiple concurrent connections to one or more processes 200, 201, using one or more different communication protocols. Executive Entity base class 500 also provides other methods, structure, routines, functions, or procedures, for cooperative processing and management thereof 508, such as receive and handle management directives (e.g., SHUTDOWN, ABORT) as required by application 112. See Appendix B for example methods of ExecutiveEntity 500.

Distributor

Figure 6:
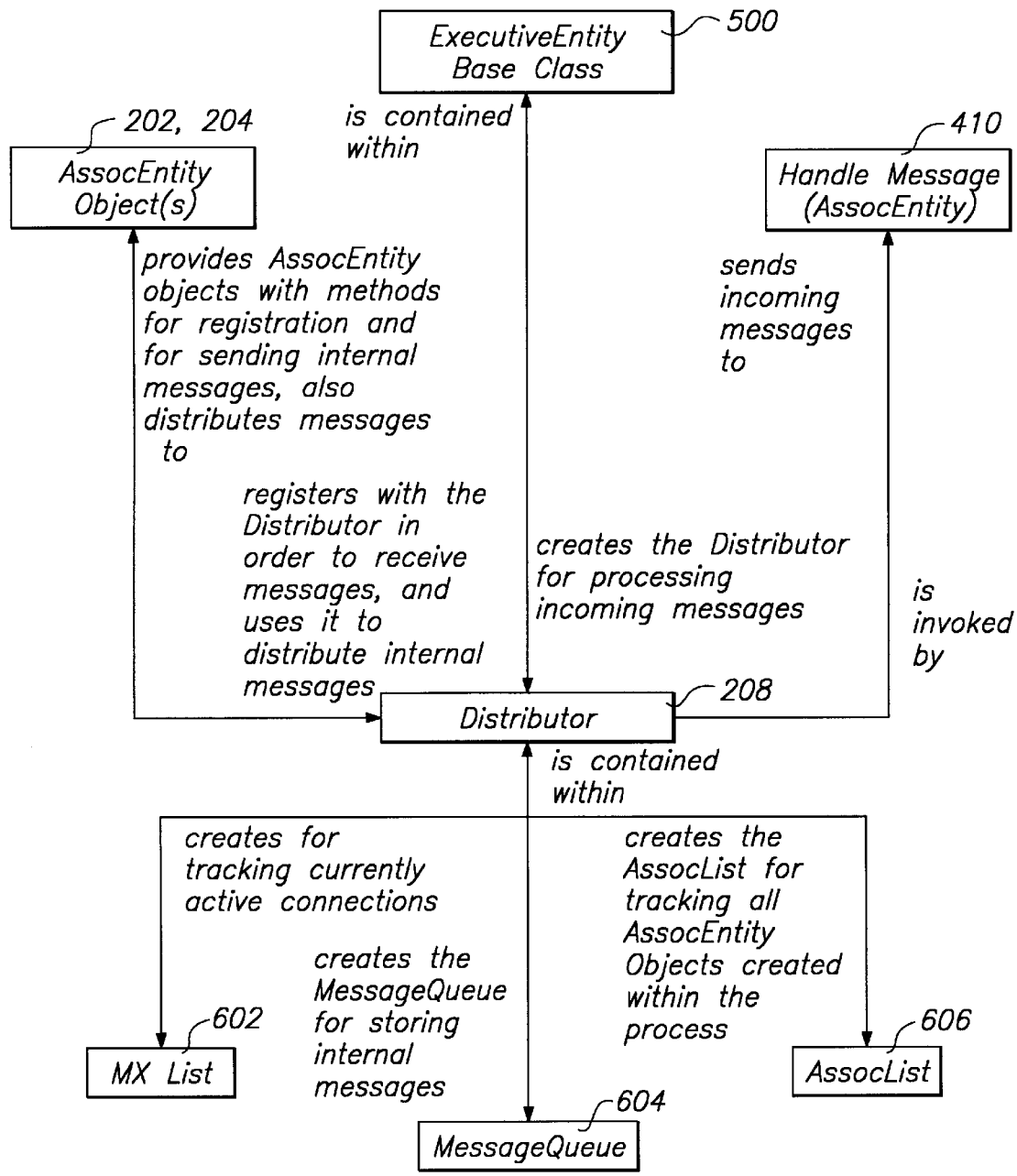
FIG. 6 is an entity relationship diagram of Distributor.

FIG. 6 is an entity relationship diagram of Distributor 208. Distributor 208 is created by ExecutiveEntity 500', and is completely functional when created—there is no need to create a process-specific derived class for the Distributor functionality. Generally, there is one Distributor 208 per process 200, 201.

As discussed above, Distributor 208 receives all incoming messages and routes them to the appropriate objects 202, 204. There is no need for agent 202 or server 204 object to ask Distributor 208 for incoming messages since Distributor 208 will automatically call the object's 202, 204 HandleMessage( ) method when a message is received for that object. Also, when a new agent object 202 is created in the client process 200, Distributor 208 (in the client process 200) sends a message to ExecutiveEntity 500' (in the server process 201, via Dispatcher 210 in the client process) to create an associated server object 204.

In order to keep track of objects 202, 204 created within the process domain 200, 201, Distributor 208 uses AssocList 606 comprising a list of pointers to objects 202, 204. When an object 202, 204 is created, it automatically registers itself with AssocList 606 in Distributor 208, and AssocList 606 returns a unique AssocEntity ID 402. AssocEntity ID 402 is used to identify objects 202, 204 when messages are passed.

Distributor 208 uses method SendMessage 404 (provided by base class AssocEntity 400) to communicate with other objects (see above).

Distributor 208 maintains Message Exchange (MX) list 602 to track the currently active connections in each process. The actual mechanism used for communication is encapsulated in GCS 106. GCS provides a single interface to multiple communication protocols, e.g., NETBIOS, APPC, TCP/IP or Named Pipes. MX objects 702 use the GCS 106 to provide a single interface to different communication interfaces.

Distributor 208 enables AssocEntities 400 in the same process to communicate in an optimized way via MessageQueue 604. An AssocEntity can send a message to another AssocEntity (or ExecutiveEntity 500) by using the SendInternalMessage method( ). These messages are placed into the MessageQueue 604 to be processed by the Distributor 208 in the same manner as external messages. Since these messages do not cross processing boundaries, no encoding or decoding of the Message objects 408 is performed.

Dispatcher

Figure 7:
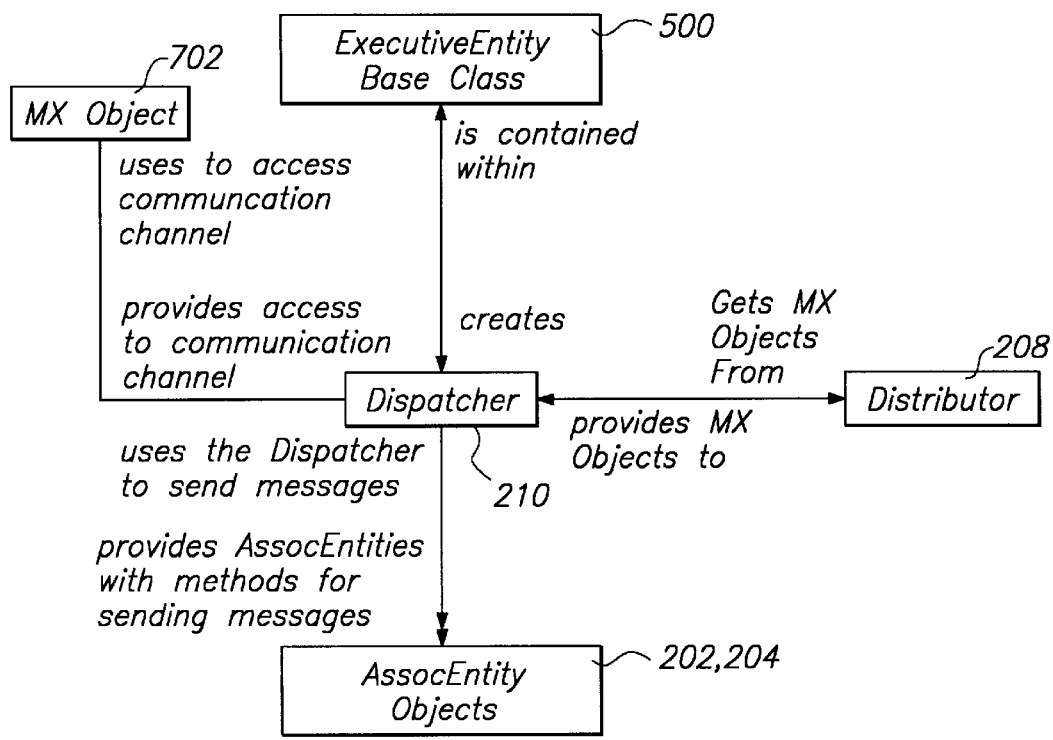
FIG. 7 is an entity relationship diagram of Dispatcher.

FIG. 7 is an entity relationship diagram of Dispatcher 210. As discussed above, Dispatcher 210 is used by objects 202, 204 to send outgoing messages for a processing. For example, requests and responses sent between cooperating agent-server objects 202, 204. Dispatcher 210 uses method SendMessage 404 (provided by base class AssocEntity 400) to communicate with other objects. Dispatcher 210 converts outgoing Message objects 408 into encoded buffers, and Distributor 208 converts them back into Message objects 408 using the methods of the Message object 408. Using the present invention, the precise implementation of the communication and other routing functionality is shielded from the application programmer.

Dispatcher 210 uses Message Exchange (MX) objects 702 to send messages via communication channel 1201 (FIG. 12). For example, Dispatcher 210 uses a UNIX "ReceiveAny" or similar-type function to monitor all currently active connections. When an object 202, 204 sends a message, the Distributor 208 provides the Dispatcher 210 the MX List 602 to determine the proper destination location for the message in MX object 702.

Server Process

Figure 9:
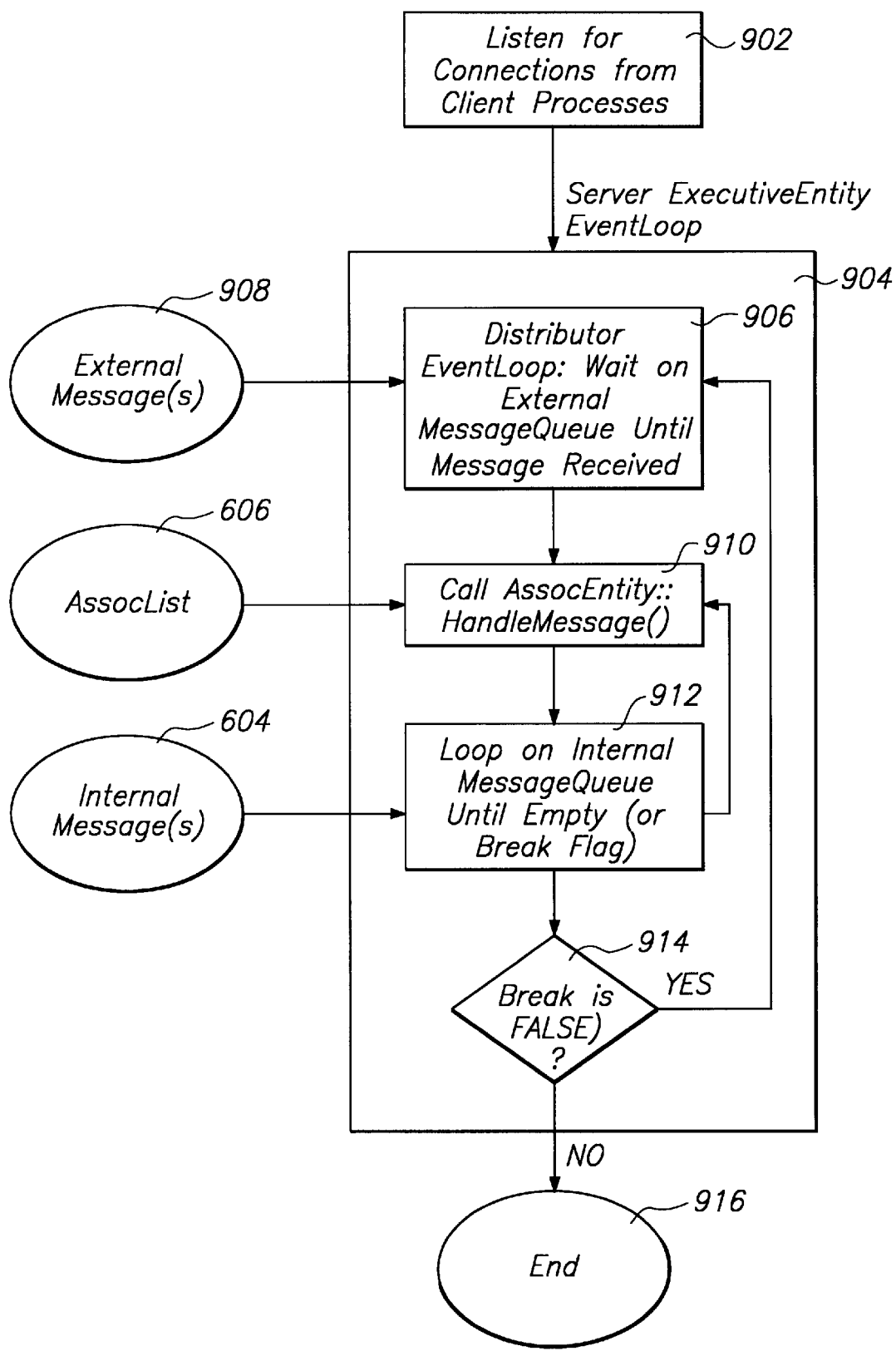
FIG. 9 is a flowchart of the server process EventLoop.

A flowchart illustrating server process flow is shown in FIG. 9.

1. Construction of the ExecutiveEntity

When the server ExecutiveEntity's 500' constructor is called 802 the following actions occur:

1. The server ExecutiveEntity's base classes (ExecutiveEntity 500 and AssocEntity 400) are created 803, using a special constructor that automatically registers the newly created base class objects with the Distributor 208.
2. The server Distributor 208 is created 804 which: registers with the Generalized Generic Communications Services (GCS), creates the internal MessageQueue 604, and creates the AssocList object 606 to contain a list of the server process AssocEntity objects 204.
3. The server Dispatcher 210 is created and passed the address of the Distributor 806.
4. The ExecutiveEntity calls AssocEntity::Register( ) and registers itself with the Distributor 808. As this is always the first AssocEntity to register with the server Distributor, the ExecutiveEntity is guaranteed to have an association handle of zero.

2. Preparing to Receive Connection

Once the server ExecutiveEntity is constructed, a call is made to the ExecutiveEntity::Listen( ) method to prepare for a connection 902. The Listen( ) call does not actually create a connection. A connection is established when the server process receives a connect request message while in EventLoop( ). CPM automatically handles the connect request message by accepting the connection.

Depending on the capabilities of the transport protocol (e.g., CPI-C, NETBIOS, Named Pipe, TCP/IP, . . . ) a single process may be able to issue multiple Listen( ) calls to handle multiple concurrent connections.

3. EventLoop

ExecutiveEntity's EventLoop method 904 provides control for the program's process flow. ExecutiveEntity's EventLoop calls the Distributor's EventLoop method and passes a flag which tells the Distributor to wait on messages in the incoming queue 906. The Distributor's EventLoop implements a while loop which:

1. Waits on the external message queue 906 until an incoming external message is received 908.
2. When an external message is received, Distributor 208 retrieves the association handle ID from the message and determines the AssocEntity 204 (or other object) to which the message should be distributed (via a call to AssocList object 606).
3. A call to the determined AssocEntity 204 HandleMessage( ) method is made to process the request 910. HandleMessage( ) determines the correct AssocEntity method to process the request. As described above, HandleMessage is implemented by all derived classes.
4. Once the AssocEntity has completed processing the original message, the Distributor loops through the internal message queue (e.g., messages from other server objects), processing other messages (if any) in the same manner; until no messages remain 912.
5. If no errors have occurred, and the Distributor's BreakFlag is not set to TRUE, processing returns to the top of the while loop 914 where it waits for another message on the external queue 906. The Distributor's BreakFlag is typically set by one of the ExecutiveEntity's action routines when, for example, a Shutdown request has been received 916.

Client Process

1. Construction of the ExecutiveEntity

Figure 8:
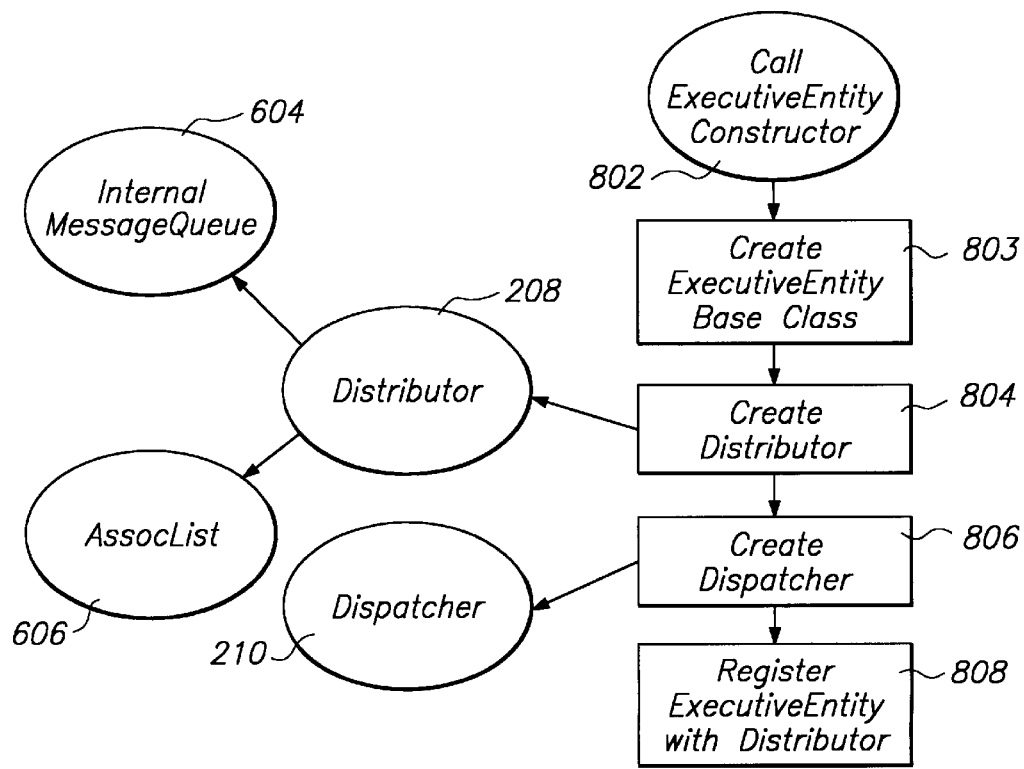
FIG. 8 is a flowchart of the setup of the client and server processes.

Construction of the derived client ExecutiveEntity 500' object class in the client process 200 is the same as in the server process 201. The client ExecutiveEntity 500' registers with the client Distributor 208. See FIG. 8.

2. Establishing a Connection

Other than construction of the client ExecutiveEntity, the client processes are generally different from that of the server processes because the user is generating requests, and control must be passed back to the user while requests are being processed. Therefore, client processes and methods can not make blocking calls while waiting for messages.

Figure 10:
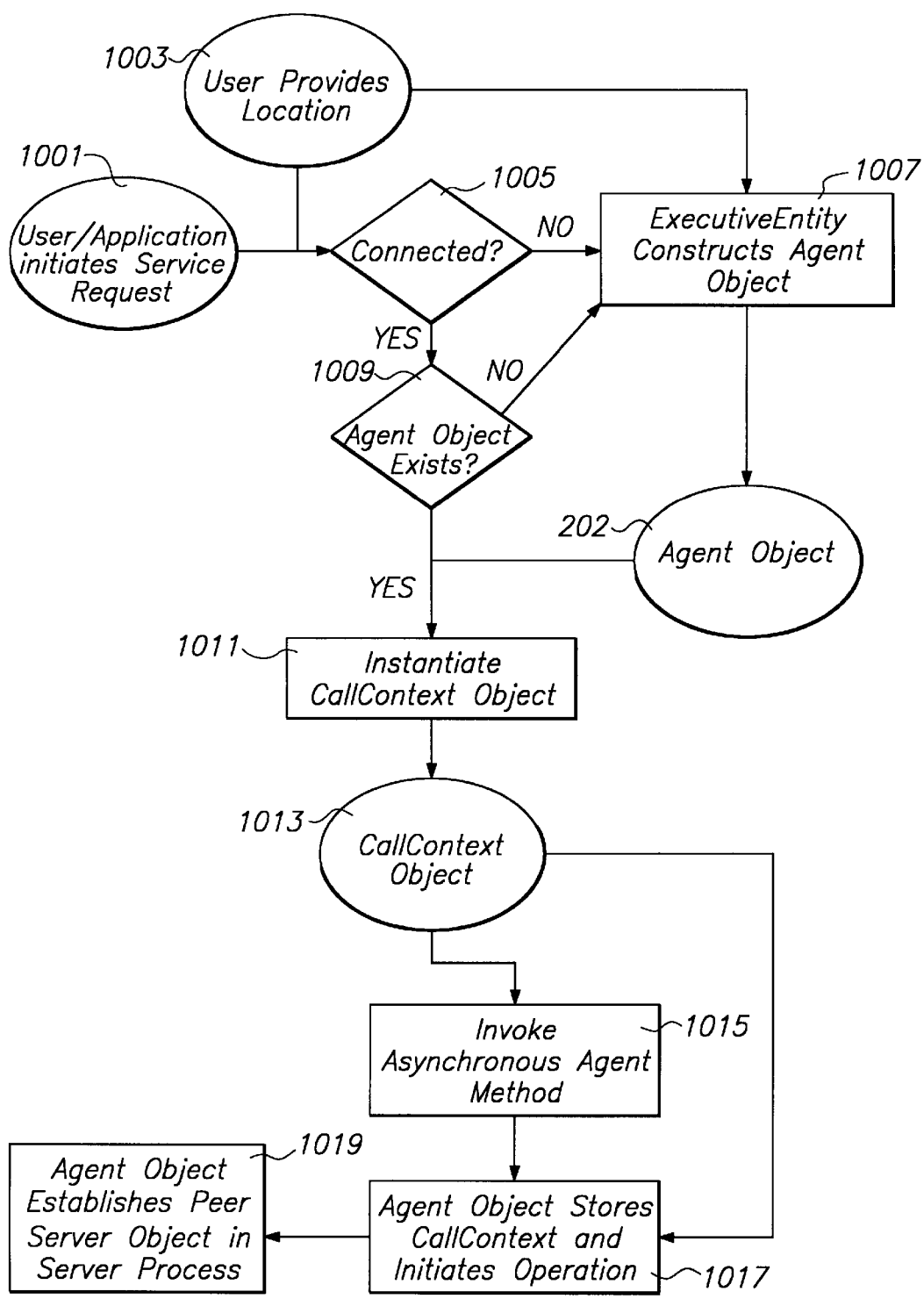
FIG. 10 is a flowchart of the client asynchronous method invocation.

Referring to FIG. 10, a flowchart of the connection process is shown. Generally a user initiates a call or service request to the Executive Entity::Connect( ) method from an application 1001. Unlike the Listen( ) method, the Connect( ) method does not return until the connection is established (or there is an unrecoverable error). To create a connection, enough information must be supplied to locate the other process. Such location information is carried in an object 1003, for example, having the following attributes:

Server Name
User ID
Password
Alias or TP Name

If the client and server are not already connected 1005, the ExecutiveEntity::Connect( ) method constructs an agent object 202 (i.e., instantiated from the user-defined AssocEntity class 400') 1007. When agent object 202 is constructed, it is passed the same location object 1003 used to establish the connection which it then uses for all communications to the server. It is also possible to encapsulate the entire connection process within the construction of the derived AssocEntity object which can help to shift some work away from the application developer.

3. Asynchronous Method Invocation

If a connection with the server has already been made 1005, a check is made for the existence of an agent object 1009. If no agent object exists, one is constructed 1007, using the location object 1003. If an agent object exists 1009, a CallContext object 1013 (discussed below) is instantiated 1011. Now, an asynchronous method of the agent object 202 can be invoked 1015. The agent object 202 stores the CallContext object 1013 and initiates the method operation 1017.

4. Binding Agent to Server Object

Agent AssocEntity object 202 establishes a peer server AssocEntity object 204 in the server process 201 (1019). This step is referred to as the bind process. The agent 202 sends a request message to the derived ExecutiveEntity 500' in the server process 201 to create the appropriate derived AssocEntity 204 in the server process. After the server ExecutiveEntity 500' constructs the AssocEntity 204, it returns its unique identifier to the agent AssocEntity 202 for the agent to use in future communications.

5. Client Distributor EventLoop—Asynchronous Interface

Figure 11:
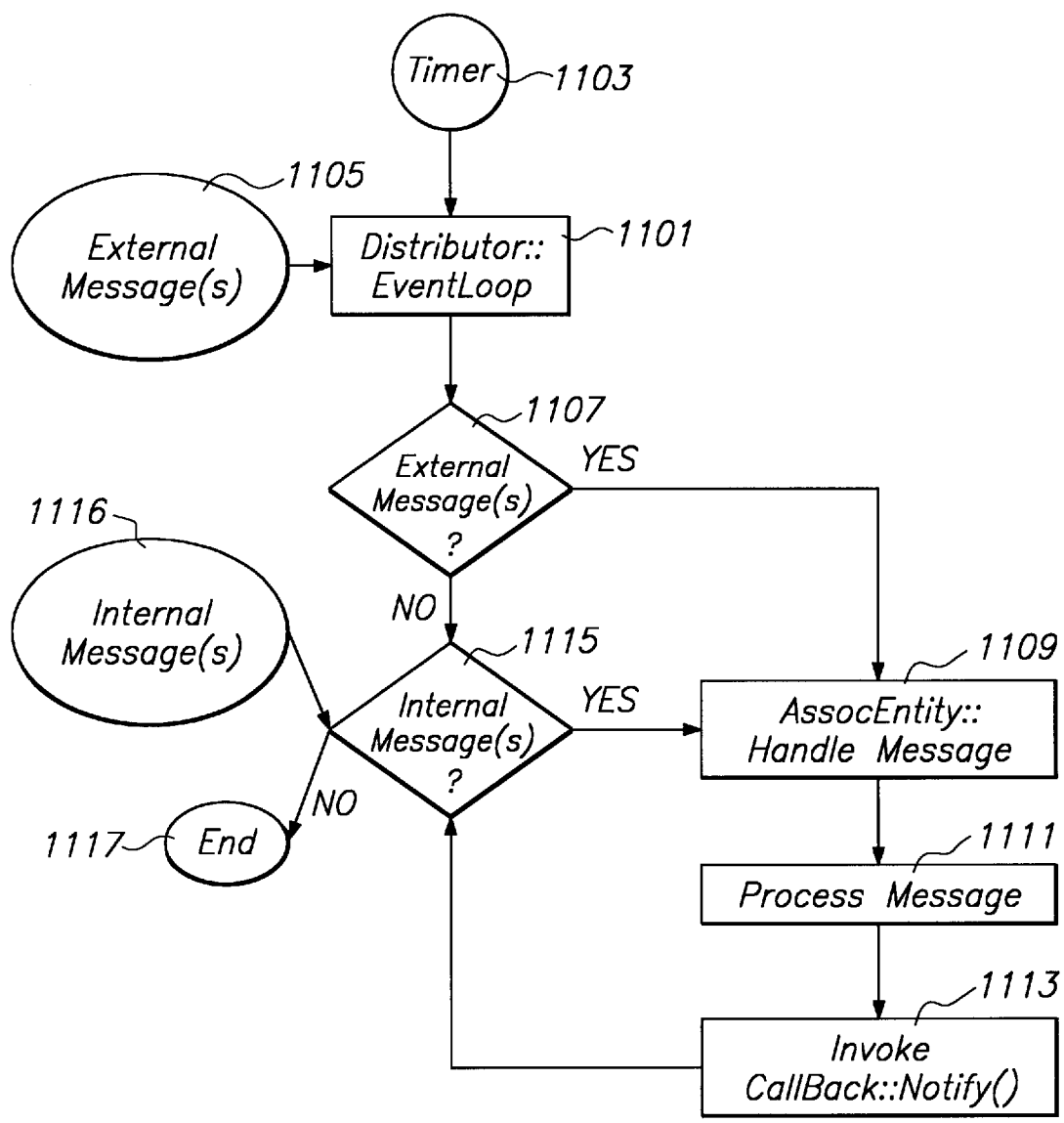
FIG. 11 is a flowchart of the client process EventLoop.

Referring to FIG. 11, a flowchart for the Distributor 208 Eventloop in the client process is shown. The Distributor 208 Eventloop in the client process is different from that of the server process Distributor EventLoop because the user is generating requests, and control must be passed back to the user while requests are being processed. Therefore, a client Distributor 208 Eventloop method can not make a blocking call while waiting for a message. Instead, the Distributor's EventLoop( ) method 1101 is invoked with a flag indicating not to wait for messages, and a timer 1103 is used to periodically poll for messages. If an external message 1105 is received 1107 during the poll 1101, it is routed by the Distributor 208 to the appropriate AssocEntity 1109 based on the AssocEntity ID contained in the message. AssocEntity::Handle Message( ) processes the message 1111, and the CallBack::notify( ) method is invoked 1113 (discussed below). A check is made for internal messages 1115. If there are internal messages 1116 (e.g., from other client objects), they are processed similarly (1109, 1111, 1113). Internal message query step 1115 can also be reached if there are no external messages, but the timer indicates initiation of an EventLoop. Once all messages have been processed 1117, control is returned back to the user. This allows the client application to be responsive to both the user and incoming messages without the use of multiple threads of execution and the inherent difficulties in developing multi-threaded applications.

The present invention uses an asynchronous interface to the agent AssocEntity objects 202 to process events in the client process. CallContext 1013 and CallBack 1113 (described below) are classes used to implement the asynchronous process.

CallContext

CallContext 1013 (along with CallBack 1113 below) is a class used to provide an asynchronous (non-blocking) interface to agent objects 202. An instance of a CallContext object is passed into each non-blocking operation 1105 of an agent object 202. The CallContext object contains: a caller specific operation code specifying the type of request or response, an optional address to some client data, and the address of a CallBack object 1113.

CallBack

CallBack is a virtual base class 1113 which contains a method called Notify( ) which must be implemented in the derived class. Notify( ) takes a CallContext object 1013 as a parameter. The agent object 202 saves the CallContext object when a non-blocking operation is invoked (see step 1017 above). The operation is then performed (e.g., by the server object 204). When the results of the operation are available, the agent 202 invokes Notify( ) of the CallBack object 1113, passing back the saved CallContext object 1013. Thus, using CallBack a service provider is isolated from the details of its client.

The CallBack object is often used as part of a multiple inheritance hierarchy for an existing class. For example, a window class would inherit from a Window base class as well as CallBack.

As an example, in a traditional distributed data editor application, an editor object would invokes a Redraw method of a client window when there is a data change. However, this would require the editor object to have knowledge of, and be dependent on, the window's interface. More specifically, the editor and windowing program must be compiled using the same user interface library. By using the CallBack interface, the editor can be built as a stand-alone module which can support any interface such as character cell, batch, or windowed.

As an example of the asynchronous process shown in FIG. 11, consider a data editor agent object, which inherits from AssocEntity 400, in a distributed file application having data windows which invoke non-blocking methods. The data window class inherits from the CallBack class and implements a Notify( ) method. When the window invokes an asynchronous method of the editor, it passes in a CallContext object which contains a pointer to itself (since the window inherits from the CallBack class, it is a CallBack object). Since it was a non-blocking operation, the method immediately returns and the window is made available for more input. Depending on the application, this may require the window to display a watch pointer (for this window only) or to disable certain menu choices. When the operation is complete (i.e., a response is received by a remote server object), the editor invokes the Notify( ) method of the CallBack object which is implemented in the data window. The editor does not know anything about the CallBack object except that it has a Notify( ) method. It does not know that it is a window, or that if has anything to do with the user interface. When Notify( ) is invoked, the data window can then update its display and return to its normal state.

Alternately, a more simplistic polling system can be used to give control to the Distributor to process incoming messages. The incoming MessageQueue is polled by creating, for example, a Presentation Manager Timer and corresponding timer event handler that invokes the client EventLoop with the wait-flag set to FALSE. When Event-Loop is called with the wait-flag FALSE, the flow of control is as follows: if there are no messages in the external queue, all messages on the internal queue (if any) will be handled and control will return directly to the calling method to continue processing. If there are messages in the external queue, the first message plus all messages in the internal queue will be handled before returning control to the calling method. The advantage to this method over using threads incoming messages is that the implementation is platform independent and there can be no conflicts with multiple threads concurrently accessing the same application resources (e.g., memory or windows).

Example Process Flow of CPM

An example process flow of the present invention is shown below in the context of a distributed Editor File application as previously discussed above.

1) The application 112 creates an instance of an agent File object 202 and invokes the Open( ) method. The agent File object 202 first sends a message (through SendMessage and the Dispatcher) to the file server to initiate the bind process and create an instance of a server File object 204. The agent is returned the ID of the server object, and thereafter the two AssocEntities, agent and server, work together as a cooperative object 110. The agent File object 202 sends an Open request message containing the server object's ID to the server File object 204. The server's Distributor 208 receives this message and, using the AssocEntity ID 402, routes the message to the proper server File object 204. The message also contains the ID of the agent object so the server object can send the response.

2) According to the user-defined Open( ) method implemented in the server File object 204, the server File object processes the client File object request.

3) The server File object 204 sends the response from the Open request back to the agent File object 202. The client Distributor 208 receives this message and, again using the agent AssocEntity ID 402, routes the message to the proper agent File object 202. The agent File object 202 then notifies the application 112 that the operation is complete (see the Asynchronous interface section).

4) The application 112 then invokes the Read method of the agent File object 202. Since there are no records locally, the agent File object 202 sends a read request to its peer server File object 204. When the server File object 204 receives the request, it reads 50 records and sends them back to the agent File object 202. The agent File object 202 then returns the first record to the application 112.

5) The application 112 invokes the agent File object 202 Read method again. This time the record is available, so it is simply returned to the application by the agent File object 202.

6) Write and Close methods would be handled similarly by sending the proper data and request from the agent object to the server object.

Using the present invention, the application 112 simply invokes operations on object agents as if they were local. The application does not need to determine whether a service provider is in the same process, in another process on the same machine, or on another machine. The method or protocol of communication (e.g., TCP/IP, SNA, CPI-C) does not concern the application programmer. And, if the mode of communication changes there will be no impact on the application code. Furthermore, applications developed using the common CPM framework will inherently have similar designs, thus reducing maintenance costs, increasing reusability, and increasing developer productivity.

FIG. 12 shows a block diagram of software and hardware components for implementing one embodiment 1200 of the present invention described above. Client 1202 and Server 1203 processors are conventional engineering workstation or other computer processors such as an Intel 80×86 or Pentium central processing unit (CPU), Motorolla 680×0 CPU, RISC CPU and the like, and need not be the same type of processor. One or more conventional communication channels 1201 are used to communicatively couple processors 1202, 1203. Communication channel 1201 operates under, for example, NETBIOS, APPC, TCP/IP, SNA, CPI-C, Ethernet, Appletalk, Token Ring, or Named Pipes, or other similar communication protocols. Processors 1202, 1203 may also be coupled to other processors accessible over additional communications channels or buses (not shown). Processor 1202, 1203 are conventionally coupled to computer storage 1204, 1205, respectively which may be a magnetic disk storage, a CD storage unit, or other conventional computer data storage unit. Storage 1204, 1205 may also be coupled to other storage units accessible over conventional communications channels or buses (not shown).

Processors 1202, 1203 are also conventionally coupled to memory 1208, 1209, respectively, which are random access memory (RAM) unit or other conventional computer memory. Items in memory 1208, 1209 may alternatively be stored in storage 1204, 1205, respectively, and accessed by processors 1202, 1203, respectively, when required. Memory 1208, 1209 comprises CPM 108 software (e.g., as shown in FIG. 2 and described above) running on each machine 1202, 1203. Memory may also comprise local applications 1210, 1211 that interact with CPM 108 and its objects, and an operating system 1217, 1218 running on processors 1202, 1203, respectively. Operating systems 1217, 1218, and applications 1210, 1211 need not be the same on each processor 1202, 1203.

Input devices 1213, 1214 comprise conventional input devices such as a keyboard, mouse, trac ball, or touchscreen, and are conventionally coupled to processors 1202, 1203, respectively. Conventional display units 1215, 1216 may also be conventionally coupled to processors 1202, 1203, respectively.

The preferred embodiment of the present invention 1200 may be implemented on any platform, operating system, and user interface such as: IBM PC or Compatibles/Microsoft Windows; Sun/Sun OS-SunView; DEC VAX/VMS, and the like. Processing systems 1202, 1203 need not be of the same type.

Appendix A

Example

There are two ways to view the use of the CPM framework. One is as a developer of cooperative objects, and the other is as an application developer using cooperative objects to implement some functionality in an application. The developer of cooperative objects should have a working knowledge of CPM, client/server architectures, inter-process communication techniques, multiple distribution models, and event-driven programming. However, application developers using CPM cooperative objects need only understand what services the cooperative objects provide, event-driven programming, and a limited understanding of communication/distribution issues.

Designing a Cooperative Product

A designer begins the development of a cooperative or distributed product by identifying the services the product will provide to the user and the data necessary to provide those services. Then, the distribution of the functionality and data is determined. There are three basic models for distribution which can be used individually or together in any combination:

1. Distributed Interface - User interface is separate from the data and product functionality, or the interface to an object is separate from its implementation.
2. Distributed Functionality - Product (or object) functionality executes in both the client and server environments.
3. Distributed Data - Data resides in multiple locations.

CPM framework supports any combination of all three models. For example, an Editor user interface may run on an OS/2 workstation with the target data store on another machine (distributed UI). To increase user response time, the data being edited may be maintained in both the application process and the server process (distributed data) and edit functions can execute both locally and remotely in parallel (distributed functionality). Different combinations will be appropriate for different products.

A list of objects with a description and list of responsibilities for each object is constructed. The responsibilities for each object are determined by the actions performed on the object (or by the object) to fulfill the product requirements. The objects do not have to be small/discrete entities. For example, an object may be an 'Editor' object which contains and/or uses Files, Tables, Lists and Records. Distribution boundaries within or between objects are determined. It is not important to define what model of distribution is used, only where a boundary should exist. Objects which are distributed (data, interface, or functionality) are candidates to become AssocEntities.

The AssocEntity class is used as the base class for creating distributed objects. One or more AssocEntity objects may be required. A data server, for example, might have AssocEntities for modeling sequential files, relational data base tables, and hierarchical data bases. And, an edit server might have an AssocEntity for a relational database editor and a flat-file editor. The editor entities could use the data entities above. In general, the design will be determined by how functionality and data are distributed.

Once the objects are identified, interfaces between objects and major components (i.e., user interface and application) are defined. Interfaces should be considered carefully since changes in the interfaces may necessitate reworking collaborative code.

Defining a Protocol

Once the AssocEntity objects have been identified, a protocol for communication between the two halves (e.g., agent and server 202, 204) of the distributed object 110 is defined. The protocol is the set of request and response messages needed for the object to fulfill its responsibilities or services. The interaction within the cooperative object will take the form of dialogues. That is, the services will exist as a series of related requests, responses, and/or directives. Different types of dialogues will be appropriate for different types of services. *An Introduction to OSI, Open Systems Interconnection* (Dennis MacKinnon et al., Computer Science Press) defines three types of dialogues: simple, synchronized, and transaction oriented.

1. Simple - the objects need only to exchange information between themselves, without synchronization or commitment.
2. Synchronized - explicit synchronization occurs between objects in the course of processing.
3. Transaction - the dialogue has commitment semantics.

Once the type of dialogue for each service is determined, the semantics are defined. For every dialogue the operation is defined (request or response), and its associated parameters. In the case of synchronized and transaction-oriented dialogues, the order in which the related operations take place is also defined.

Defining Messages

5   Once the protocol has been established, the messages to transport the requests and responses are defined. One message is defined for every possible operation and response. Each message definition contains a full description of the message's parameters. In one embodiment, a message object is defined by:
   1. Creating a file containing a definition for each message (a message
10     definition file or .MDF).
   2. Creating a compiled message description file (.DSC) and a header file (.HMS) from the .MDF file to be included in both the sending and receiving process.
   3. During process startup, the static Message method LoadMessageDefs() is
15     invoked with the name of a file (*.LST) containing a list of .DSC files for the cooperative objects to be used.

Listing 1 contains an example .MDF file. For more information on how messages are defined, see the *Message Object Application Programming Reference*, Compuware Corp.

20

---

Listing 1 - Sample Message Definition File (.MDF)

```
#*******************************************************
#            Compuware Corporation

# File Name:  YYYY.MDF

# Description: This is the Message Description File (MDF) used to define
#              messages created and/or received by the YYYY class.
#              The PARSEMDF program uses this file to generate a header
#              file (YYYY.HMS) containing "#define" definitions for the
#              various operations and operation parameters (members).
#              PARSEMDF also generates a YYYY.DSC file containing the
#              descriptions of those operations and parameters as used by
#              the MESSAGE object.

```

```
         #         NOTE: The header description block that follows this
         #         block will be placed in the generated header file. Please
         #         update this block and the header block as necessary.
         #
 5       # $Header$
         # $Log$
         #***************************************************************/
         *              Compuware Corporation
         *
10       * File Name: YYYY.HMS
         *
         * Description: Definitions file for messages created and/or received
         *              by the YYYY class.
         *
15       * Developer: Whomever
         ***************************************************************/

#       ClassId       Class Name
         CLASS:  1             "YYYY"
20
         // OPENFILE REQUEST
         #       Define                Operation Name
         OPER:   OODB_OPNFILRQ         "OpenFile Request"
         #       Type    Opt/Mand Define                      Element Name
25       ELEM:   CSTR    MAND     YYYY_OPNFILRQ_FNAME         "File Name"
         ELEM:   SHORT   OPT      YYYY_OPNFILRQ_PERMS         "Perm Mode"
         ELEM:   USHORT  MAND     YYYY_OPNFILRQ_OPFLAGS       "Open Flags"
         ELEM:   BSTR    MAND     YYYY_OPNFILRQ_OBJECT        "Object Name"

30       // OPENFILE RESPONSE
         #       Define                Operation Name
         OPER:   OODB_OPNFILRP         "OpenFile Response"
         #       Type    Opt/Mand Define                      Element Name
         ELEM:   SHORT   MAND     YYYY_OPNFILRP_RESULT        "Result"
35       ELEM:   SHORT   OPT      YYYY_OPNFILRP_HANDLE        "Handle"
```

Creating ExecutiveEntity

Every process must have an ExecutiveEntity. The ExecutiveEntity object, instantiated from a user-defined ExecutiveEntity object class, which is inherited from the ExecutiveEntity base class (which, in turn, is inherited from the AssocEntity base class), is responsible for providing the managerial needs of the process. ExecutiveEntity is an abstract base class, thus, a derived object class must be implemented. ExecutiveEntity base class provides a standard set of managerial directives and the methods needed to resolve those directives. In both the client and server process, the base class ExecutiveEntity creates the Distributor and Dispatcher objects used for sending and receiving messages.

In a server process, the main role of the ExecutiveEntity is to create instances of the server object when a request is received from the agent in a client process. The constructor for an AssocEntity in a client program usually sends a "Bind" or other similar request to a server process to request that its other half be started. The HandleMessage() method of the ExecutiveEntity in this server process will receive these messages and construct the AssocEntity in the server process. The server ExecutiveEntity then responds to the client AssocEntity with the AssocEntity ID of the newly created object. In a strictly client program, the HandleMessage() method of the ExecutiveEntity() will likely be empty. ExecutiveEntity does not create AssocEntities in the client—AssocEntities are created in response to a user request.

When creating the process-specific ExecutiveEntity object (inherited from the ExecutiveEntity base class), methods for handling the ExecutiveEntity managerial services are defined. The ExecutiveEntity HandleMessage method is also implemented. HandleMessage is automatically called by the Distributor when a message for the ExecutiveEntity object is received. HandleMessage takes an opCode and a message pointer as its input parameters. Which process-specific ExecutiveEntity method to call is determined by the opCode.

Creating AssocEntity Objects

AssocEntity is also an abstract base class—a derived class must be implemented for each type of AssocEntity object identified above. When an AssocEntity object 202, 204 is instantiated, it is automatically registers with the Distributor and receives a unique AssocEntity ID. Each half of the cooperative object (agent and server objects) maintain their own AssocEntity ID which is part of the return address included in every message object. All messages are targeted to a specific AssocEntity, and the Distributor uses the AssocEntity ID to determine the actual object whose HandleMessage() method is invoked.

As with the ExecutiveEntity object, the AssocEntity objects must implement a HandleMessage method. Both the client and server AssocEntity instances implement a HandleMessage() method. In the server object, HandleMessage() generally receives service requests. HandleMessage() in turn invokes methods in the server object to satisfy these requests and sends responses back to the client portion of the object. HandleMessage() in the client object is responsible for handling responses. It invokes methods in the client object which notify the caller (often the user interface part of the client process) that the original request has been fulfilled.

Implementing a 'Main' Routine for a Server Process

A typical 'main' routine for a server process will performs the following steps:
1. Initialize event logging system.
2. Load message definitions.
3. Instantiate the process-specific class derived from ExecutiveEntity.
4. Issue an ExecutiveEntity::Listen() call to prepare to receive connections from client processes.
5. Call the ExecutiveEntity's EventLoop. (This method will continue running until the server's processing has completed.)
6. Destruct the derived ExecutiveEntity.
7. Exit.

Listing 3 contains an example of a 'main' routine for a server process. "G90", as occasionally used below, refers to an application object-oriented architecture 100 encompassing the CPM framework 108.

---
Listing 3 - Example Server Process Main Routine

```
/************************************************************
*                    Compuware Corporation
*
* File Name:  mymain.cxx
```

```
        *
        * $Header$
        * $Log$
        ***********************************************************/
  5     #include "gen90sys.h"
        #include "evthndlr.h"
        #include "message.h"
        #include "myexec.h"

10     main ()
        {
            ErrCode err = G90SUCCESS;
            // Check to see if the EventHandler started successfully
            if ( EventHandler.Init ( ) != G90SUCCESS )
 15             {
                // Possibly print a warning that logging is disabled
                }

MyExecutive* pExecutive = 0;        // Pointer to the derived ExecEntity
 20
            // Load the message definitions
            if ( err = loadMessageDefs ( "msgdefs.lst" ) == G90SUCCESS )
                {
                // Create the process' executive entity
 25             g90location ownLoc("SRVRNAME");
                pExecutive = new MyExecutive( ownLoc, TRUE);      // TRUE = wait
                                                                  //  for messages
                if ( (pExecutive != 0) && (err == G90SUCCESS) )
                    {
 30                 // Call EventLoop
                    pExecutive->Listen();    // default protocol of CPI-C
                    pExecutive->EventLoop();
                    }
                else
 35                 {
                    err = MAINERR_CREATING_SERVER
```

```
                EventHandler.logEvent("Error creating the Server Executive");
                }
            delete pExecutive;
            }
5       else
            {
            err = MAINERR_LOADING_MESSAGE_DEFS;
            EventHandler.logEvent ("Error loading messages.");
            }
10   } // End main()
```

Appendix B

Appendix B comprises example object class definitions and accompanying methods. "G90", as occasionally used below, refers to an application object-oriented architecture 100 encompassing the CPM framework 108.

AssocEntity

The AssocEntity class is used as a base class for the ExecutiveEntity class and for deriving application-specific AssocEntity object classes. The AssocEntity base class is part of the CPM object-oriented framework 108. Application-specific AssocEntity object classes are used to create product-specific cooperative objects.

All derived classes must implement the virtual HandleMessage() method.
See also: StateProgram, StateTable, ExecutiveEntity, Distributor
Include Files: assocent.h

AssocEntity()
Synopsis:
    AssocEntity::AssocEntity(BOOL execEntity = FALSE)
Description:
    Object constructor. Calls InitMembers() and if execEntity flag is FALSE (default) then also calls Register() to register with the global Distributor. This is the version of the constructor used by derived AssocEntities.
Return Value:
    None

AssocEntity()
Synopsis:
    AssocEntity::AssocEntity(Distributor& dist, ErrCode& err)
    where:
        dist  = read only; the distributor to register with.
        err   = write only; the return code.

Description:
   Object constructor. Calls Register() to register with the Distributor
   identified by dist. This constructor is only used to register with a
   specific instance of a Distributor object and is only included for
   backward compatibility.
Return Value:
   G90SUCCESS - Success
   AE_ERR_SET_ASSOC - Could not register with the Distributor.

~AssocEntity()
Synopsis:
   virtual AssocEntity::~AssocEntity(void)
Description:
   Object destructor. This method invokes the method
   Distributor::RemoveAssoc() to remove itself from the distributor's
   AssocList.
Return Value:
   None
Note:
   The destructor is declared 'virtual' so that it will be called correctly
   from the derived class' destructor.

HandleMessage()
Synopsis:
   virtual ErrCode AssocEntity::HandleMessage(ULONG opCode,
                                              Message* pmessage = 0) = 0
where:
   opCode   = read only; The operation code associated with the
              message received.
   pmessage =   read only; A pointer to the message received.
Description:
   HandleMessage is a pure virtual method that must be implemented by
   any class derived from AE. Derived classes should make the calls to
   their problem solving action routines from their implementation of
   this method. If a derived class also inherits from StateProgram, HandleMessage should also store pmessage and call StateProgram's
HandleEvent().
Return Value:
defined by the derived class
Example:
The following is an example implementation of a derived class'
HandleMessage() method assuming that the derived class also inherits
from StateProgram.

ErrCode ClassName::HandleMessage(ULONG opCode, Message*
pmessage)
{
pMessage = pmessage;   // Store message for later use // Translate opCode into event using EventLookup object
USHORT event;
MessEventAssoc.GetEvent(opCode, event);

return (HandleEvent(event));  // Call StateProgram::HandleEvent()
}

GetLocation()
Synopsis:
const g90location& GetLocation()
Description:
Returns the g90location object for this AE. The return value from
this method should be passed in on calls to the SendMsg() method.
Return Value:
The AE's location.

SetLocation()
Synopsis:
void SetLocation(g90location newLoc)
Description:
Sets the AE's location which will be returned on a call to
GetLocation(). This method is automatically called by the base class AE's constructor and should not generally be called by the derived class.
Return Value:
   The AE's location.

SendMsg()
Synopsis:
   ErrCode SendMsg(Message& msg, g90location& destination)
Description:
   Sends msg to the destination process/AE specified in destination via the Dispatcher.
Return Value:
   AE_ERR_SENDING - Could not send message

SendInternalMsg()
Synopsis:
   ErrCode SendInternalMsg(Message& msg, USHORT aeHandle)
Description:
   Sends msg to the AE specified in aeHandle which is in the same process via the Dispatcher. This avoids the encoding/decoding step of message sending. This method can also be used to allow a single-threaded server to be responsive to multiple service requests and/or cancel requests. For example, an AE for a file server receives a request to read a file. It reads the data into fixed size blocks and sends a series of response messages to the requestor until all the data has been sent. If the AE reads the entire file without returning from the original invocation of HandleMessage() then the server can not respond to any incoming requests. However, if after sending a block of data, the AE sends itself an internal message to read the next block then new requests will be processed in-between blocks of data.
Return Value:
   AE_ERR_SENDING - Could not send message
Note:
   When you receive an internal message, the return address will be the return address of the sending AE in your process. If you want the handler of the internal message to send a response to an AE in another process, you must store the original g90location object
before calling SendInternalMessage().

Handle()
Synopsis:
USHORT Handle()
Description:
Retrieves the AssocEntity's association handle.
Return Value:
Returns the value stored in OwnAssocHandle.

ExecutiveEntity
The ExecutiveEntity base class is derived from the AssocEntity base class
and provides means for process wide functionality and communication including
the creation of the Distributor and Dispatcher objects. This class is used as a base
class, and the derived class must provide an implementation for the
HandleMessage() method.
See also:
AssocEntity, Distributor, Dispatcher
Include Files:
execent.h

ExecutiveEntity()
Synopsis:
ExecutiveEntity::ExecutiveEntity(const g90location& ownName,
BOOL blockingReceive = FALSE,
USHORT service = (USHORT)(BASIC | QSEND) )
where:
| | | |
|---|---|---|
| ownName | = | read only; The location of this process' incoming queue. Passed on to, and saved by, the Distributor constructor. |
| blockingReceive | = | Flag indicating whether or not to do a blocking receive by default. Can be overridden on call to EventLoop(). |
| service | = | GCS class of service flags. See the GCS manual for information on these flags. |

Description:
The constructor for the ExecutiveEntity class. Creates a Distributor
and Dispatcher and then calls Register() to register with the
Distributor as AE 0. The parameter ownName will be used by every
other AE as its return address on message sends. The parameter
blockingReceive is generally set to TRUE for server processes and
FALSE for client (GUI) processes.
Return Values:
None

Connect()
Synopsis:
ErrCode ExecutiveEntity::Connect(g90location* partner,
         UCHAR protocol = CPIC_1C,
         const char* puserData = 0,
         ULONG userDataLength = 0)
where:
| | |
|---|---|
| partner | = read/write; The location of the process to connect to. The connection ID will be added to partner after a successful connection. |
| protocol | = The GCS protocol to use. See the file GCSAPI.H for valid constants. |
| puserData | = The address of data to be passed on the connect call. Can be used for version verification. |
| userDataLength | = The length of the data in puserData in bytes. |

Description:
This method is used to establish a connection to another process. This
method will not return until a connection has been established to the
process specified in partner, or until there is an error. Different
mechanisms for resolving the location of the other process will be
used depending on the values in the partner g90location parameter
and the protocol desired.
For CPI-C connections: if the User ID and Password are set in
partner, then they will be used for CPI-C connections. If a Server
Name has been set, then Connection Manager objects will be used to
retrieve the PLU and Mode Name for that server. If a Server Name

- 40 - and Alias Name have been set, then Connection Manager objects will be used to get the TP Name from the Alias Name. If however, a Server Name and TP Name have been set, then the TP Name specified will be used. If an Alias Name has been set without a Server Name, then the Alias Name is passed to GCS and is assumed to be the name of an OS/2 Communications Manager side-info entry. No other protocol currently uses the User ID, Password, Server Name or TP Name fields of the partner g90location object. Only the Alias Name is used to establish a connection.

The Connect() method is usually called from client processes, and Listen() from server processes. However, there is no reason why a single process can not call both.

Listen()

Synopsis:
    ErrCode ExecutiveEntity::Listen(UCHAR protocol = CPIC_1C,
                                      USHORT* connectionID)

where:
| | |
|---|---|
| protocol | = The GCS protocol to use. See the file GCSAPI.H for valid constants. |
| connectionID | = output; The new connection ID returned from GCS. |

Description:
This method is used to indicate a willingness to receive a connection initiated by another process using a Connect() call. The Listen() call does not block, it returns immediately even if there is currently no partner. CPM processes all connect requests by calling the GCS Accept function. CPM will never refuse a connection request. The Listen() method is usually called from server processes, and Connect() from client processes. However, there is no reason why a single process can not call both.

DisConnect()
Synopsis:
ErrCode ExecutiveEntity::DisConnect(USHORT connectionID)
where:
connectionID = The ID of the connection to terminate. This value can be retrieved from the g90location object used to create the connection.

Description:
This method is used to gracefully end a connection to another process. It will also clean-up the appropriate CPM connection related objects.

HandleMessage()
Synopsis:
virtual ErrCode ExecutiveEntity::HandleMessage(ULONG opCode, Message* pmessage = 0) = 0
where:
opCode = read only; The option code associated with the message received.
pmessage = read only; A pointer to the message received.

Description:
This virtual method must be implemented in the derived class. The derived HandleMessage() should handle all process-wide messages (like SHUTDOWN) and (in server processes) requests to create new AE instances. For more information on this method, see AssocEntity::HandleMessage().

EventLoop()
Synopsis:
ExecutiveEntity::EventLoop(BOOL waitFlag = TRUE)
where:
waitFlag = read only; Flag indicating if method should wait on an empty queue for a message.

Description:
This method simply provides access to the Distributor's EventLoop method. For more information, see Distributor::EventLoop(). The waitFlag parameter controls whether or not EventLoop() will make a blocking GCS receive call and whether or not EventLoop() will process multiple incoming messages. If waitFlag is FALSE, EventLoop() will not block (i.e., will not wait for a message) and will return after processing a single message. If waitFlag is TRUE, EventLoop() will make a blocking GCS receive call (wait for a message or GCS abort) and will continue processing messages until there is an error. The waitFlag parameter is generally set to FALSE in client processes and TRUE in server processes. Client processes usually implement a polling mechanism (e.g. PM timers) to periodically call EventLoop() with waitFlag FALSE. If waitFlag is TRUE, the method Distributor::BreakLoop() can be called any time during the processing of a message to force an exit from EventLoop() and end the processing of incoming messages (useful when a server process receives a shutdown request).

Dispatcher

The Dispatcher class is responsible for sending outgoing messages. Since its methods are declared 'static', no instance of a Dispatcher object needs to be constructed. Instead, the Dispatcher methods are invoked by using the scope resolution operator, i.e., Dispatcher::SendMsg(...). Actually, the Dispatcher is generally not called directly from user code; instead, use the SendMsg() and SendInternalMsg() methods of the AssocEntity class.

See also:
AssocEntity, Distributor, MX
Include Files:
dspatchr.h

Dispatcher()
Synopsis:
Dispatcher::Dispatcher(Distributor* distrib)
where:
distrib         = read only; this process' Distributor object.
Description:
There should be only one instance of a Dispatcher object for each process, and the one instance is automatically constructed by the ExecutiveEntity base class. User code does not call any Dispatcher methods directly. The distrib parameter is stored by the Dispatcher object for use in the SendMsg() method.
Return Value:
   none

SendMsg()
Synopsis:
   ErrCode Dispatcher::SendMsg(Message& msg, const g90location& dest,
                               g90location& returnAddress)
where:
   msg           = read only; the message to be sent.
   dest          = read only; where to send the message.
   returnAddress = read only; where receiving process should send response.
Description:
   SendMsg() is used to send a message (msg) to another process through GCS. This method encodes the input message into a CPM message buffer. It then calls the Distributor to get the MX object for the location specified in dest. It then uses the MX object returned by the Distributor to send the message to the other process. The return location (returnAddress) is also added to the message buffer.
Return Value:
   G90SUCCESS - Successful completion
   DISPATCH_ERR_ENCODE - Could not encode the message
   DISPATCH_ERR_SEND - Could not send message

SendInternalMsg()
Synopsis:
   ErrCode Dispatcher::SendInternalMsg(Message& msg,
           USHORT destAEHandle, const g90location& returnAddress)
where:
   msg           = the message to be sent.

```
destAEHandle    = the handle of the AssocEntity to receive
                  message
returnAddress   = where to send response.
```
Description:
This method is used to send a message (msg) to another AssocEntity within the same process. It adds returnAddress to the message and calls the Distributor's ReceiveInternalMessage() method. This method is used to more efficiently send Message objects within the same process (no encoding and decoding steps needed) and to allow the interleaving of the processing of incoming messages. For example, instead of just going off an working on a time-consuming task, an AE could break the task into small chunks and send itself an internal message at the end of each piece to instruct itself to move on to the next step. By doing this, the AE could respond to a request from the client to cancel the original request, since CPM checks the external message queue before processing internal messages.

Return Value:
G90SUCCESS - Successful completion
DISPATCH_ERR_SEND - Could not send message

Distributor

The Distributor class is responsible for receiving incoming messages and forwarding them to the appropriate AssocEntity(AE) object. The list of available AEs are kept internally in an AssocList object. A single Distributor object for each process is automatically created by the ExecutiveEntity base class.

See also:
AssocEntity, ExecutiveEntity, Dispatcher
Include Files:
distrib.h

Distributor()
   Synopsis:
      Distributor::Distributor(const g90location& ownName,
                     BOOL blockingReceive = FALSE,
                     USHORT service = BASIC | QSEND)
   where:
      ownName        = read only; The location of this process'
                       incoming queue. Passed on to, and saved by,
                       the Distributor constructor.
      blockingReceive = Flag indicating whether or not to do a blocking
                       receive by default. Can be overridden on call
                       to EventLoop().
      service        = GCS class of service flags. See the GCS
                       manual for information on these flags.
   Description:
      Distributor constructor. This function creates an AssocList for
      storing references to all AssocEntity instances constructed in this
      process, a MessageQueue for storing internal messages and a list for
      storing MX objects (one MX object for each GCS connections). It
      also registers the application with GCS via the GCREG call. There
      should be only one instance of a Distributor object for each process,
      and the one instance is automatically constructed by the
      ExecutiveEntity base class.
   Return Value:
      none

~Distributor()
   Synopsis:
      Distributor::~Distributor()
   Description:
      Object destructor. This routine is called to delete the Distributor and
      its instance variables from memory. Deregisters the application with
      GCS by calling the GCDEREG call. Destroys any MX objects which
      will end all GCS connections.

Return Value:
   None

Connect()
Synopsis:
   ErrCode Distributor::Connect(g90location* partner,
                          UCHAR protocol = CPIC_1C,
                          const char* puserData = 0,
                          ULONG userDataLength = 0)
where:
   partner       = read/write; The location of the process to
                        connect to. The connection ID will be added
                        to partner after a successful connection.
   protocol      = The GCS protocol to use. See the file
                        GCSAPI.H for valid constants.
   puserData    = The address of data to be passed on the connect
                        call. Can be used for version verification.
   userDataLength = The length of the data in puserData in bytes.
Description:
   The description for this method can be found in
   ExecutiveEntity::Connect().

Listen()
Synopsis:
   ErrCode Distributor::Listen(UCHAR protocol = CPIC_1C,
                          USHORT* connectionID)
where:
   protocol      = The GCS protocol to use. See the file
                        GCSAPI.H for valid constants.
   connectionID  = output; The new connection ID returned from
                        GCS.
Description:
   The description for this method can be found in
   ExecutiveEntity::Listen().

EventLoop()
   Synopsis:
      ErrCode Distributor::EventLoop(BOOL waitflag = TRUE)
   where:
      waitflag           = read only, optional; Flag indicating whether to
                           wait for a message. Default is TRUE.
   Description:
      The flow of control loop in the Distributor. If the waitflag argument
      is TRUE (default), it continually loops in a "fetch message and
      process" cycle. Each time an external message has been processed,
      EventLoop checks the internal message queue and processes any
      messages found there. If waitflag is FALSE, it only loops through
      the "fetch message and process" cycle once, or returns if there are no
      messages to process.
   Return Value:
      G90SUCCESS - Successful completion
      DISTRIB_ERR_OBJECT_NEW - error creating MsgBuff object
      DISTRIB_ERR_RECEIVE_MSG - error calling MX::Receive
   Comments:
      The method Distributor::BreakLoop() may be called by an action
      routine called by ProcessMsg (e.g. Shutdown()) to force a break
      from EventLoop. Also, this method is generally not called directly
      from user code but instead from ExecutiveEntity::EventLoop().

ProcessMsg()
   Synopsis:
      ErrCode Distributor::ProcessMsg(Message* pmsg, USHORT
      aeHandle)
   where:
      pmsg               = read only; Pointer to the message to be
                           processed.
      aeHandle           = read only; The handle for the AE to receive
                           the message.

Description:
   This method forwards a message to the appropriate Associate Entity
   (AE) whose handle is aeHandle. This method is currently called by
   EventLoop and InternalEventLoop, it could also be invoked directly
   to send a message to an AE (instead of going through EventLoop()).
Return Value:
   G90SUCCESS - Successful completion
   DISTRIB_ERR_GET_OBJHANDLE - Invalid object handle
   DISTRIB_ERR_HANDLE_MSG - Error handling the message

BreakLoop()
   Synopsis:
      void Distributor::BreakLoop()
   Description:
      This method sets an internal BreakFlag value to TRUE, forcing the
      Distributor out of the EventLoop. This method can be invoked by
      any AE to end the processing of messages in the case of a fatal error
      or a shutdown request.
   Return Value:
      None

ReceiveInternalMessage()
   Synopsis:
      ErrCode Distributor::ReceiveInternalMessage(Message& msg,
                                    USHORT destHandle)
   where:
      msg          = The message to be added to the internal
                     message queue.
      destHandle   = The handle of the AssocEntity to receive the
                     message.
   Description:
      Allows the Dispatcher to send messages to AssocEntity objects within
      the same process. Adds msg to an internal message queue which is
      processed by the InternalEventLoop method, called by EventLoop.
      The messages are passed to the AssocEntity objects in the same
      manner as messages received externally.
   Return Value:
      G90SUCCESS - Successful completion
      DISTRIB_ERR_MSG_QUEUE - error adding message to the queue
   Comments:
      The Distributor creates a copy of the message, and transferrs the
      contents of the old message into the new message, before storing it in
      the internal message queue. Once the contents of the message have
      been transferred, the message passed into the method no longer has
      access to them. This method should only be called by the

- 50 -

Dispatcher::SendInternalMsg() method and not directly from user code.

AddAssoc()
Synopsis:
ErrCode Distributor::AddAssoc(AssocEntity& ae, USHORT& assocHandle)
where:
ae = read only; The AE to add to the AssocList.
assocHandle = write only; The handle assigned to the AE.
Description:
Adds an AssocEntity object, identified by ae, to the AssocList and returns the assocHandle. This method is invoked automatically by the AssocEnity base class and should not be called from user code.
Return Value:
G90SUCCESS - Successful completion
G90FAILURE - failure

RemoveAssoc()
Synopsis:
ErrCode Distributor::RemoveAssoc(USHORT assocHandle)
where:
assocHandle = read only; The handle of the AE to remove from the AssocList.
Description:
Removes the AssocEntity object identified by assocHandle from the AssocList. This method is invoked automatically by the AssocEntity base class destructor and should not be called from user code.
Return Value:
G90SUCCESS - Successful completion
G90FAILURE - failure

GetEntity()
Synopsis:
AssocEntity* Distributor::GetEntity(USHORT assocHandle)

-51- where:
    assocHandle    = read only; The handle of the AE to retrieve.

Description:
    Retrieves a pointer to the AssocEntity corresponding to the assocHandle passed. This method is used internally by the Distributor to lookup the AE to receive an incoming message object.

Return Value:
    NULL - unable to retrieve the AssocEntity.
    AssocEntity* - a pointer to the AssocEntity.

GetLocation()

Synopsis:
    static const g90location& Distributor::GetLocation() const

Description:
    Returns the g90location object for this process. This method is often used by a derived AssocEntity object to get the return address when sending a message.

Return Value:
    g90location - the g90location object for this process.

GetMX()

Synopsis:
    MX* Distributor::GetMX(const g90location& destLoc)

where:
    destLoc    = read only; The g90location object for the MX object to retrieve.

Description:
    Returns the address of a MX object which has a GCS connection to the location specified in destLoc. This method is used by the Dispatcher when an AE requests to send a message and the g90location object for the destination does not have a connection ID.

Return Value:
    MX* - The address of the matching MX object.
    0    - No match found

-52-

GetMX()
   Synopsis:
      MX* Distributor::GetMX(USHORT connectionID)
   where:
      connectionID    = read only; The GCS connection ID for the MX
                        object to retrieve.
   Description:
      Returns the address of a MX object which has a GCS connection ID
      specified in connectionID. This method is used by the Dispatcher
      when an AE requests to send a message and the g90location object
      for the destination has a connection ID.
   Return Value:
      MX*  - The address of the matching MX object.
      0    - No match found

GetAssocListIter()
   Synopsis:
      ErrCode Distributor::GetAssocListIter(AssocListIter* &iter)
   where:
      iter            = write only; A pointer to the iterator, which
                        this method will construct.
   Description:
      Returns an AssocList iterator (iter), allowing other objects to send
      messages to, or otherwise process, all of the existing AssocEntities.
   Return Value:
      G90SUCCESS - Successful completion
      DISTRIB_ERR_OBJECT_NEW - error constructing iterator
   Comments:

The calling routine is responsible for deleting the iterator.

- 53 -

What is claimed is:

1. In a computer network comprising a client process and a server process, an object-oriented cooperative application processing system comprising:

an application executing in the client process;

a plurality of cooperative processing objects, collectively comprising agent objects and server objects, for providing cooperative processing capability in the client process and the server process to the application, each cooperative processing object inheriting from a common base class, distributing application functionality between the client process and the server process, and comprising:

an agent object in the client process for interfacing with the application, and a server object in the server process for processing requests from the client process; and a communication system for establishing and managing, with respect to the application, asynchronous communication among the agent objects and the server objects, using methods provided by the common base class.

2. The system of claim 1 wherein the communication system comprises:

a client distributor object asynchronously and automatically routing messages to the agent objects using the methods provided by the common base class;

a server distributor object asynchronously and automatically routing messages to the server objects using the methods provided by the common base class;

a client dispatcher object obtaining messages from the agent objects and asynchronously sending messages to the server distributor object using a first message exchange object method; and a server dispatcher object obtaining messages from the server objects and asynchronously sending messages to the client distributor object using a second message exchange object method.

3. The system of claim 2 wherein the agent objects automatically register themselves with the client distributor object, and the server objects automatically register themselves with the server distributor object.

4. The system of claim 2 wherein the client distributor object comprises a list of concurrent connections in the client process, and the server distributor object comprises a list of concurrent connections in the server process.

5. The system of claim 1 wherein the communication system comprises:

a plurality of message exchange objects encapsulating a plurality of communication protocols and providing a common interface to a plurality of communication interfaces.

6. The system of claim 1 wherein the server object processes requests from the agent object by communicating with application programs running in the server process.

7. In a computer network comprising a client process and a server process, an object-oriented cooperative processing framework for generating cooperative processing objects for use in a cooperative processing application executing in the client process, the framework comprising:

a common base class comprising:

a method for handling messages received from other objects, and a method for sending messages to other objects, wherein the cooperative processing objects, providing cooperative processing capability in the client process and the server process to the application executing in the client process, are generated, each cooperative processing object inheriting from the common base class and comprising:

an agent object instantiated in the client process for interfacing with the application, and a server object instantiated in the server process for processing requests from the agent object;

distributor objects, including a client distributor object instantiated in the client process and a server distributor object instantiated in the server process, for routing messages to the agent object and the server object using methods provided by the common base class; and dispatcher objects, including a client dispatcher object instantiated in the client process and a server dispatcher object instantiated in the server process, for obtaining messages from the agent object and the server object using the methods provided by the common base class, wherein the client dispatcher object is communicatively coupled to the server distributor object in an asynchronous manner using message exchange object methods, and the server dispatcher object is communicatively coupled to the client distributor object in an asynchronous manner using the message exchange object methods.

8. The cooperative processing framework of claim 7 wherein the distributor objects asynchronously and automatically route messages to the agent object and the server object using the methods provided by the common base class.

9. The cooperative processing framework of claim 7 wherein the method for sending messages is provided by the common base class and comprises a destination location and a message object, and wherein the message object comprises:

a return address corresponding to a response location;

an operation code for specifying a type of operation requested and data associated with the operation; and a method for encoding and decoding the data to facilitate asynchronous communication between the client process and the server process.

10. The cooperative processing framework of claim 7 wherein the application instantiates the agent object in the client process, and in response thereto the server object is instantiated in the server process.

11. The cooperative processing framework of claim 7 wherein the distributor objects further comprise:

a list of objects instantiated from the first object class, wherein each object instantiated from the first object class automatically registers with the list upon instantiation.

12. The cooperative processing framework of claim 7 wherein the distributor objects further comprise:

a list of concurrent connections in the computer network.

13. The cooperative processing framework of claim 7 further comprising:

a plurality of message exchange objects encapsulating a plurality of communication protocols, wherein the distributor objects and the dispatcher objects communicate asynchronously using the message exchange objects.

14. In a computer network system comprising a server process and a client process having an application program executable thereon, a method for providing cooperative processing to the application program, the method comprising the steps of:

creating one or more agent objects in the client process for interfacing with the application program;

creating a server object in the server process associated with each agent object in the client process, the server and agent objects inheriting from a common base class;

creating a client distributor object in the client process for receiving messages and asynchronously routing them to the agent objects using methods provided by the common base class;

creating a server distributor object in the server process for receiving messages and asynchronously routing them to the server objects using the methods provided by the common base class;

creating a client dispatcher object in the client process for obtaining messages from the agent objects and for asynchronously sending messages to the server distributor object using a first message exchange object method;

creating a server dispatcher object in the server process for obtaining messages from the server objects and for asynchronously sending messages to the client distributor object using a second message exchange object method;

registering each agent object in the client distributor object; and registering each server object in the server distributor object.

* * * * *